United States Patent
Luo et al.

(10) Patent No.: US 10,341,970 B2
(45) Date of Patent: Jul. 2, 2019

(54) TECHNIQUES FOR TRANSMITTING SYNCHRONIZATION SIGNALS IN A SHARED RADIO FREQUENCY SPECTRUM BAND

(71) Applicant: QUALCOMM Incorporated, San Diego, CA (US)

(72) Inventors: Tao Luo, San Diego, CA (US); Aleksandar Damnjanovic, Del Mar, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 70 days.

(21) Appl. No.: 14/866,381

(22) Filed: Sep. 25, 2015

(65) Prior Publication Data

US 2016/0142994 A1    May 19, 2016

Related U.S. Application Data

(60) Provisional application No. 62/080,622, filed on Nov. 17, 2014.

(51) Int. Cl.
*H04W 56/00* (2009.01)
*H04W 74/08* (2009.01)
(Continued)

(52) U.S. Cl.
CPC ....... *H04W 56/0015* (2013.01); *H04L 5/0048* (2013.01); *H04W 56/001* (2013.01); *H04W 74/0808* (2013.01); *H04W 16/14* (2013.01)

(58) Field of Classification Search
CPC .................................................. H04W 72/04
See application file for complete search history.

(56) References Cited

U.S. PATENT DOCUMENTS

2009/0129298 A1* 5/2009 Luo ...................... H04L 27/2602
370/280
2012/0140714 A1* 6/2012 Koskela ................ H04W 56/00
370/329

(Continued)

FOREIGN PATENT DOCUMENTS

WO   WO-2013063808 A1   5/2013
WO   WO-2014018333 A2   1/2014

OTHER PUBLICATIONS

ISA/EPO, International Search Report and Written Opinion of the International Searching Authority, Int'l. App. No. PCT/US2015/052656, dated Dec. 23, 2015, European Patent Office, Rijswijk, NL, 12 pgs.

(Continued)

*Primary Examiner* — Sulaiman Nooristany
(74) *Attorney, Agent, or Firm* — Dalei Dong; Holland & Hart LLP

(57) ABSTRACT

Techniques are described for wireless communication. A first method includes generating a first type of synchronization signal based at least in part on a first type of transmission in a shared radio frequency spectrum band, and generating a second type of synchronization signal based at least in part on a second type of transmission in the shared radio frequency spectrum band. The second type of synchronization signal is different from the first type of synchronization signal. A second method includes receiving a synchronization signal associated with a type of transmission in a shared radio frequency spectrum band; determining a type of the synchronization signal; and determining one or more cell parameters based at least in part on the synchronization signal.

13 Claims, 18 Drawing Sheets

(51) Int. Cl.
*H04L 5/00* (2006.01)
*H04W 16/14* (2009.01)

(56) References Cited

U.S. PATENT DOCUMENTS

| 2016/0100404 A1* | 4/2016 | Han ........................ H04L 5/00 |
| | | 370/329 |
| 2017/0105112 A1* | 4/2017 | Park ..................... H04W 8/005 |
| 2017/0265082 A1* | 9/2017 | Jiang .................... H04W 16/14 |

OTHER PUBLICATIONS

Motorola Mobility, "Physical Layer Options for LAA-LTE," 3GPP TSG RAN WG1 #78bis, R1-144236, Ljubljana, Slovenia, Oct. 6-10, 2014, 2 pgs., 3rd Generation Partnership Project.

* cited by examiner

TECHNIQUES FOR TRANSMITTING SYNCHRONIZATION SIGNALS IN A SHARED RADIO FREQUENCY SPECTRUM BAND

CROSS REFERENCES

The present application for patent claims priority to U.S. Provisional Patent Application No. 62/080,622 by Luo et al., entitled "Techniques for Transmitting Synchronization Signals in a Shared Radio Frequency Spectrum Band," filed Nov. 17, 2014, assigned to the assignee hereof, and is hereby incorporated by reference herein in its entirety.

BACKGROUND

Field of the Disclosure

The present disclosure, for example, relates to wireless communication systems, and more particularly to techniques for transmitting synchronization signals in a shared radio frequency spectrum band.

Description of Related Art

Wireless communication systems are widely deployed to provide various types of communication content such as voice, video, packet data, messaging, broadcast, and so on. These systems may be multiple-access systems capable of supporting communication with one or more users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

By way of example, a wireless multiple-access communication system may include a number of base stations, each simultaneously supporting communication for one or more communication devices, otherwise known as user equipments (UEs). A base station may communicate with UEs on downlink channels (e.g., for transmissions from a base station to a UE) and uplink channels (e.g., for transmissions from a UE to a base station).

Some modes of communication may enable communications between a base station and a UE over a shared radio frequency spectrum band, or over different radio frequency spectrum bands (e.g., a dedicated radio frequency spectrum band and a shared radio frequency spectrum band) of a cellular network. With increasing data traffic in cellular networks that use a dedicated (e.g., licensed) radio frequency spectrum band, offloading of at least some data traffic to a shared radio frequency spectrum band may provide a cellular operator with opportunities for enhanced data transmission capacity. A shared radio frequency spectrum band may also provide service in areas where access to a dedicated radio frequency spectrum band is unavailable.

Prior to gaining access to, and communicating over, a shared radio frequency spectrum band, a base station or UE may perform a listen before talk (LBT) procedure to contend for access to the shared radio frequency spectrum band. An LBT procedure may include performing a clear channel assessment (CCA) procedure to determine whether a channel of the shared radio frequency spectrum band is available. When it is determined that the channel of the shared radio frequency spectrum band is available, a channel usage beacon signal (CUBS) may be transmitted to reserve the channel.

When first powering up or establishing communication with a cellular network, a UE may perform a procedure commonly known as acquisition of a cell (e.g., initial acquisition of a cell). When performing acquisition of a cell, a UE may monitor a radio frequency spectrum band for synchronization signals transmitted by a cell (e.g., a base station). Upon receiving a synchronization signal, the UE may determine a timing of a radio frame boundary with which the synchronization signal is aligned. The UE may then synchronize its timing with the timing of the cell, receive other transmissions from the base station, and enter a radio resource control (RRC) connected state with the base station. When performing a cell measurement after acquisition of the cell, a UE may measure the energies of one or more synchronization signals, and use the measured energy or energies, for example, when performing a frequency reselection or cell search. In a dedicated radio frequency spectrum band, synchronization signals may be transmitted and received at predetermined times in every radio frame. However, in a shared radio frequency spectrum band, the transmission of at least some synchronization signals may depend on a base station winning contention for access to the shared radio frequency spectrum band.

SUMMARY

The present disclosure, for example, relates to one or more techniques for transmitting synchronization signals in a shared radio frequency spectrum band. In some examples, a base station may transmit a synchronization signal in a shared radio frequency spectrum band during one or more of a plurality of discovery signal transmissions, which may be CCA-exempt transmissions (CETs; e.g., one or more of a plurality of downlink CETs (D-CETs)) in the shared radio frequency spectrum band. In various examples, a CET can refer to a broadcast transmission that does not require a clear-channel assessment, or a broadcast transmission that requires a clear-channel assessment that is simplified in comparison to a data transmission. A synchronization signal transmitted in a shared radio frequency spectrum band during a discovery signal transmission may be aligned, for example, with a discovery signal transmission boundary, with a CET period boundary, an LBT frame boundary, or a radio frame boundary, and transmission of a synchronization signal during a discovery signal transmission may ensure that the synchronization signal can be transmitted. However, discovery signal transmissions may occur infrequently, such as once every 80 milliseconds. As a result, a base station may also transmit synchronization signals in a shared radio frequency spectrum band opportunistically. An opportunistic transmission may, for instance, refer to a base station attempting to transmit a synchronization signal at some other interval, such as between, and/or more often than various discovery signal transmission occurrences (e.g., at a 10 ms interval), with the opportunistic transmission following a successful LBT procedure. In other examples, an opportunistic transmission may coincide with a discovery signal transmission, but may otherwise require a more-simplified clear-channel assessment than a data transmission. For example, in an LBT frame or radio frame for which a base station has won contention for access to the shared radio frequency spectrum band, the base station may transmit a synchronization signal during a subframe of the LBT frame or radio frame. A synchronization signal transmitted in a shared radio frequency spectrum band during a subframe of an LBT frame or radio frame may be aligned, for example, with an LBT frame boundary or radio frame boundary.

For purposes of acquisition of a cell, the transmission of synchronization signals in a shared radio frequency spectrum band during discovery signal transmissions, or the opportunistic transmission of synchronization signals in the shared radio frequency spectrum band during the subframes of LBT frames or radio frames, may be sufficient. However, the transmission of other synchronization signals, such as synchronization signals that may or may not be aligned with a discovery signal transmission boundary, a CET period boundary, LBT frame boundary, or radio frame boundary, may be useful for purposes such as cell measurement (e.g., for purposes such as cell search after acquisition of a cell). The present disclosure describes techniques for generating different synchronization signals based at least in part on different types of transmissions in a shared radio frequency spectrum band, and/or techniques for mapping different synchronization signals to different types of transmissions in a shared radio frequency spectrum band, so that a UE does not become confused and interpret a synchronization signal incorrectly.

In an example, a method for wireless communication is described. In some examples, the method may include generating a first type of synchronization signal based at least in part on a first type of transmission in a shared radio frequency spectrum band, and generating a second type of synchronization signal based at least in part on a second type of transmission in the shared radio frequency spectrum band. The second type of synchronization signal may be different from the first type of synchronization signal.

In an example, an apparatus for wireless communication is described. In some examples, the apparatus may include means for generating a first type of synchronization signal based at least in part on a first type of transmission in a shared radio frequency spectrum band, and means for generating a second type of synchronization signal based at least in part on a second type of transmission in the shared radio frequency spectrum band. The second type of synchronization signal may be different from the first type of synchronization signal. In some examples, the apparatus may include means for implementing one or more aspects of the method for wireless communication described above with respect to the first set of illustrative examples.

In an example, an apparatus for wireless communication is described. In some examples, the apparatus may include a processor, memory in electronic communication with the processor, and instructions stored in the memory. The instructions may be executable by the processor to generate a first type of synchronization signal based at least in part on a first type of transmission in a shared radio frequency spectrum band, and generate a second type of synchronization signal based at least in part on a second type of transmission in the shared radio frequency spectrum band. The second type of synchronization signal may be different from the first type of synchronization signal. In some examples, the instructions may also be executable by the processor to implement one or more aspects of the method for wireless communication described above with respect to the first set of illustrative examples.

In an example, a non-transitory computer-readable medium storing computer-executable code for wireless communication is described. In some examples, the code may be executable by a processor to generate a first type of synchronization signal based at least in part on a first type of transmission in a shared radio frequency spectrum band, and generate a second type of synchronization signal based at least in part on a second type of transmission in the shared radio frequency spectrum band. The second type of synchronization signal may be different from the first type of synchronization signal. In some examples, the code may also be used to implement one or more aspects of the method for wireless communication described above with respect to the first set of illustrative examples.

In some examples of the method, apparatuses, or non-transitory computer-readable medium described above, the first type of transmission may include an opportunistic transmission, and generating the first type of synchronization signal may include generating the first type of synchronization signal based at least in part on the opportunistic transmission and based at least in part on winning contention for access to the shared radio frequency spectrum band. In some examples, the opportunistic transmission may include a subframe of an LBT frame or a radio frame, which in some examples may be a beginning subframe of an LBT frame or a radio frame. In some examples, the opportunistic transmission may include a periodic opportunistic transmission.

In some examples of the method, apparatuses, or non-transitory computer-readable medium described above, the first type of transmission may include a discovery signal transmission, which may be a CET, and generating the first type of synchronization signal may include generating the first type of synchronization signal based at least in part on the discovery signal transmission.

Some examples of the method, apparatuses, or non-transitory computer-readable medium may include processes, features, means, or instructions for generating a third type of synchronization signal based at least in part on a third type of transmission in the shared radio frequency spectrum band. The third type of synchronization signal may be different from the first type of synchronization signal and the second type of synchronization signal. In some examples, the third type of transmission may include an opportunistic transmission, and generating the third type of synchronization signal may include generating the third type of synchronization signal based at least in part on the opportunistic transmission and based at least in part on winning contention for access to the shared radio frequency spectrum band.

In some examples of the method, apparatuses, or non-transitory computer-readable medium described above, processes, features, means, or instructions for generating the second type of synchronization signal may include processes, features, means, or instructions for generating the second type of synchronization signal upon winning contention for access to the shared radio frequency spectrum band. In some examples of the method, the first type of synchronization signal may include a first type of secondary synchronization signal transmitted in a first half of a radio frame transmitted in a dedicated radio frequency spectrum band. In some examples, the second type of synchronization signal may include a second type of secondary synchronization signal transmitted in a second half of a radio frame transmitted in the dedicated radio frequency spectrum band.

In some examples of the method, apparatuses, or non-transitory computer-readable medium described above, the second type of synchronization signal may include a first type of secondary synchronization signal transmitted in a first half of a radio frame transmitted in a dedicated radio frequency spectrum band. In some examples, the first type of synchronization signal may include a second type of secondary synchronization signal transmitted in a second half of a radio frame transmitted in the dedicated radio frequency spectrum band.

In some examples of the method, apparatuses, or non-transitory computer-readable medium described above, processes, features, means, or instructions for transmitting the first type of synchronization signal and transmitting the second type of synchronization signal may be performed by or associated with a base station.

In an example, a method for wireless communication is described. In one example, the method may include receiving a synchronization signal associated with a type of transmission in a shared radio frequency spectrum band, determining a type of the synchronization signal, and determining one or more cell parameters based at least in part on the synchronization signal.

In an example, an apparatus for wireless communication is described. In one example, the apparatus may include means for receiving a synchronization signal associated with a type of transmission in a shared radio frequency spectrum band; means for determining a type of the synchronization signal; and means for determining one or more cell parameters based at least in part on the synchronization signal.

In an example, an apparatus for wireless communication is described. In one example, the apparatus may include a processor, memory in electronic communication with the processor, and instructions stored in the memory. The instructions may be executable by the processor to receive a synchronization signal associated with a type of transmission in a shared radio frequency spectrum band, determine a type of the synchronization signal, and determine one or more cell parameters based at least in part on the synchronization signal.

In an example, a non-transitory computer-readable medium storing computer-executable code for wireless communication is described. In one example, the code may be executable by a processor to receive a synchronization signal associated with a type of transmission in a shared radio frequency spectrum band, determine a type of the synchronization signal, and determine one or more cell parameters based at least in part on the synchronization signal.

In some examples of the method, apparatuses, or non-transitory computer-readable medium, processes, features, means, or instructions for determining the one or more cell parameters may include processes, features, means, or instructions for determining at least a first cell parameter based at least in part on the type of the synchronization signal. In some examples, the determined type of the synchronization signal may include a first type of synchronization signal usable for initial acquisition of a cell. In some examples, the determined type of the synchronization signal may include a second type of synchronization signal usable for performing a cell measurement.

Some examples of the method, apparatuses, or non-transitory computer-readable medium described above may include processes, features, means, or instructions for determining the type of transmission based at least in part on the type of the synchronization signal. In some examples, processes, features, means, or instructions for determining the one or more cell parameters may include processes, features, means, or instructions for determining at least a second cell parameter based at least in part on the type of transmission. In some examples, the determined type of transmission may include a discovery signal transmission, which may be a CET, and processes, features, means, or instructions for determining the one or more cell parameters may include processes, features, means, or instructions for determining a timing of a discovery signal transmission period boundary. In some examples, the determined type of transmission may include a subframe of an LBT frame or a radio frame, which may be a beginning subframe of an LBT frame or a radio frame, and processes, features, means, or instructions for determining the one or more cell parameters may include processes, features, means, or instructions for determining a timing of an LBT frame boundary or a timing of a radio frame boundary.

In some examples of the method, apparatuses, or non-transitory computer-readable medium, processes, features, means, or instructions for receiving the synchronization signal, determining the type of the synchronization signal, and determining the one or more cell parameters may be performed by or associated with a UE.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
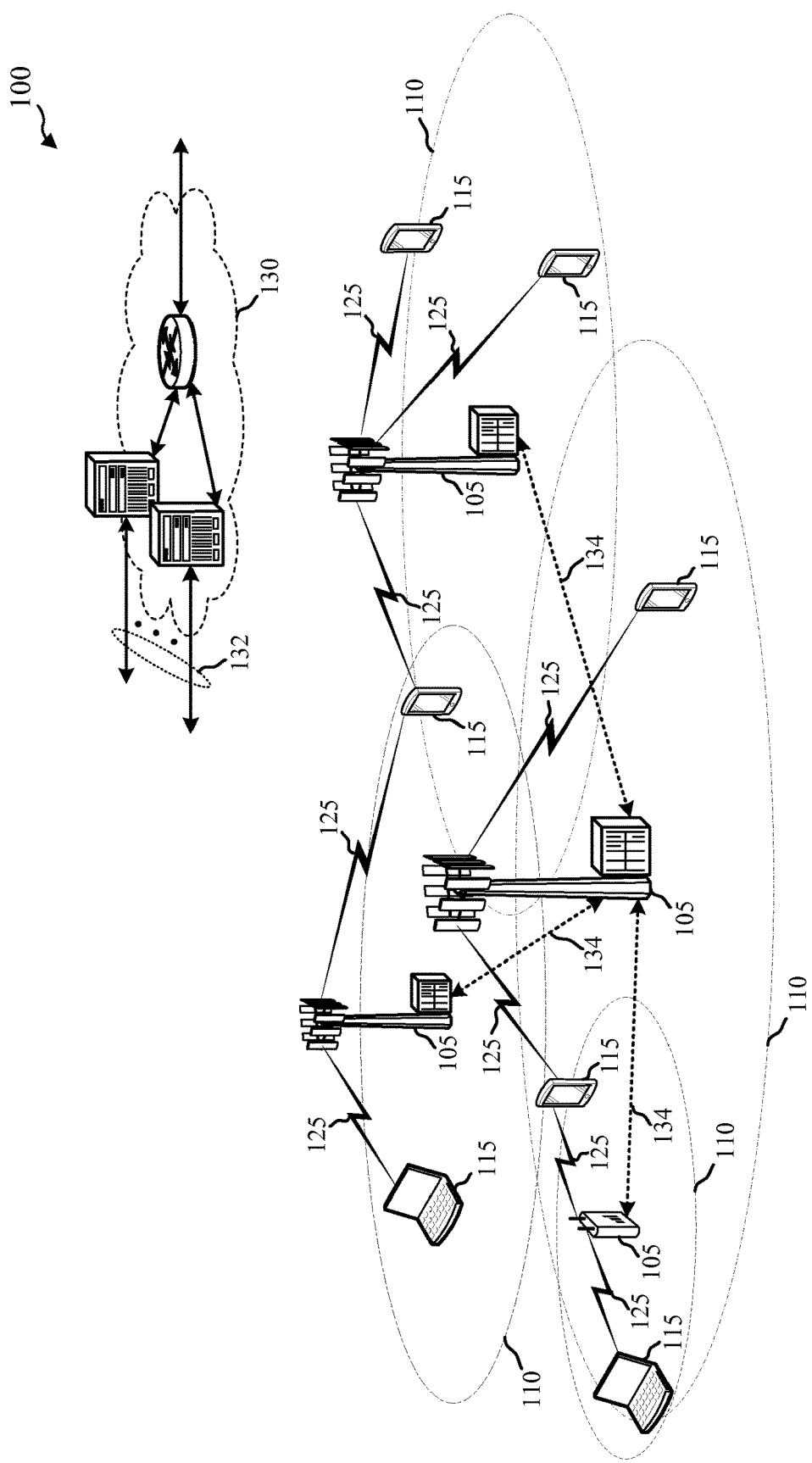
FIG. 1 illustrates an example of a wireless communication system, in accordance with aspects of the disclosure.

Techniques are described in which a shared radio frequency spectrum band is used for at least a portion of communications over a wireless communication system. In some examples, the shared radio frequency spectrum band may be used for LTE/LTE-A communications. The shared radio frequency spectrum band may be used in combination with, or independent from, a dedicated radio frequency spectrum band. The dedicated radio frequency spectrum band may be a radio frequency spectrum band for which transmitting apparatuses may not be required to contend for access because the radio frequency spectrum band is licensed to one or more users, such as a licensed radio frequency spectrum band usable for LTE/LTE-A communications. The shared radio frequency spectrum band may be a radio frequency spectrum band for which a device may need to contend for access (e.g., a radio frequency spectrum band that is available for unlicensed use, such as Wi-Fi use, or a radio frequency spectrum band that is available for use by one or more operators in an equally shared or prioritized manner).

With increasing data traffic in cellular networks that use a dedicated radio frequency spectrum band, offloading of at least some data traffic to a shared radio frequency spectrum band may provide a cellular operator (e.g., an operator of a public land mobile network (PLMN) or a coordinated set of base stations defining a cellular network, such as an LTE/LTE-A network) with opportunities for enhanced data transmission capacity. Use of a shared radio frequency spectrum band may also provide service in areas where access to a dedicated radio frequency spectrum band is unavailable. As noted above, before communicating over a shared radio frequency spectrum band, transmitting apparatuses may perform an LBT procedure to gain access to the shared radio frequency spectrum band. Such an LBT procedure may include performing a CCA procedure (or extended CCA procedure) to determine whether a channel of the shared radio frequency spectrum band is available. When it is determined that the channel of the shared radio frequency spectrum band is available, a CUBS may be transmitted to reserve the channel. When it is determined that a channel is not available, a CCA procedure (or extended CCA procedure) may be performed for the channel again at a later time.

When powering up or establishing communication with a cellular network, a UE may acquire a cell (e.g., perform an acquisition of the cell). When performing an acquisition of a cell in a shared radio frequency spectrum band, the UE may monitor the shared radio frequency spectrum band for at least a first type of synchronization signal, which at least first type of synchronization signal may be aligned with an LBT frame boundary or radio frame boundary and enable a UE to determine a timing of the LBT frame boundary or radio frame boundary. The at least first type of synchronization signal may also provide energy that the UE may measure when performing a cell measurement. The measured energy may be used, for example, for frequency reselection or cell search (e.g., neighboring cell search, for purposes of determining whether a handover of a UE to a new cell should be initiated).

A UE may also monitor a shared radio frequency spectrum band for at least a second type of synchronization signal, which at least second type of synchronization signal may also provide energy that the UE may measure when performing a cell measurement. The at least second type of synchronization signal may or may not be aligned with an LBT frame boundary or radio frame boundary, and in some examples may not be usable for acquisition of a cell.

According to some of the examples described in the present disclosure, a first type of synchronization signal may be mapped to a discovery signal transmission, which may be a CET, and/or a first type of opportunistic transmission (e.g., a subframe of an LBT frame or radio frame), and a second type of synchronization signal may be mapped to a second type of opportunistic transmission (e.g., a subframe identified for asynchronous transmission of a synchronization signal, which subframe may not be aligned with an LBT frame boundary or radio frame boundary). According to other techniques described in the present disclosure, a third type of synchronization signal may be mapped to the first type of opportunistic transmission (e.g., a subframe of an LBT frame or radio frame). Use of the first type of synchronization signal and the third type of synchronization signal may enable a UE to distinguish between a discovery signal transmission period boundary and an LBT frame boundary or radio frame boundary.

In some examples, the techniques described in the present disclosure map one or more secondary synchronization signals that may be transmitted in a dedicated radio frequency spectrum band (e.g., LTE/LTE-A secondary synchronization signals) to one or more types of transmission in a shared radio frequency spectrum band.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communication system 100, in accordance with aspects of the disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an enhanced/evolved NodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be geographic coverage areas 110 for different technologies that have overlapping areas.

In some examples, the wireless communication system 100 may include an LTE/LTE-A network. In LTE/LTE-A networks, the terms enhanced Node B or evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., dedicated, shared, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous operation or a second type of operation, where in some examples the second type of operation may be an asynchronous operation. For synchronous operation, the base stations may have similar frame timing, and transmissions from different base stations may be approximately aligned in time. For the second type of operation, the base stations may have different frame timing, and transmissions from different base stations may not be aligned in time. The techniques described herein may be used for either synchronous or a second type of operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid Automatic Repeat Request (HARM) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions, from a UE 115 to a base station 105. The downlink transmissions may also be called forward link transmissions, while the uplink transmissions may also be called reverse link transmissions. The downlink transmissions may include synchronization signals, which may be used by UEs 115 for purposes such as an acquisition of a cell or cell measurement.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. A UE 115 may be configured with one or more downlink CCs and one or more uplink CCs for carrier aggregation. Carrier aggregation may be used with both FDD and TDD component carriers.

In some examples, the wireless communication system 100 may support operation over a dedicated radio frequency spectrum band (e.g., a radio frequency spectrum band for which transmitting apparatuses may not be required to contend for access because the radio frequency spectrum band is licensed to one or more users, such as a licensed radio frequency spectrum band usable for LTE/LTE-A communications) or a shared radio frequency spectrum band (e.g., a radio frequency spectrum band for which transmitting apparatuses may need to contend for access (e.g., a radio frequency spectrum band that is available for unlicensed use, such as Wi-Fi use, or a radio frequency spectrum band that is available for use by one or more operators in an equally shared or prioritized manner)). Upon winning a contention for access to the shared radio frequency spectrum band, a transmitting apparatus (e.g., a base station 105 or UE 115) may transmit one or more CUBS over the shared radio frequency spectrum band. The CUBS may reserve the shared radio frequency spectrum by providing a detectable energy on the shared radio frequency spectrum band. The CUBS may also serve to identify the transmitting apparatus or serve to synchronize the transmitting apparatus and a receiving apparatus.

The base stations 105 may transmit synchronization signals in a dedicated radio frequency spectrum band of an LTE/LTE-A network. The synchronization signals transmitted in the dedicated radio frequency spectrum band may include, for example, a first type of secondary synchronization signal (SSS) transmitted in a first half of a radio frame, and a second type of SSS transmitted in a second half of a radio frame. In some examples, the radio frame transmitted in the dedicated radio frequency spectrum band may include ten subframes, numbered 0 through 9. The second type of SSS may be different from the first type of SSS (e.g., the second type of SSS may be based at least in part on a different sequence (e.g., a sequence having a different tone mapping or different scrambling code) than the first type of SSS).

As described in the present disclosure, synchronization signals may also be transmitted in a shared radio frequency spectrum band, and may include one or more of a first type of synchronization signal, a second type of synchronization signal, or a third type of synchronization signal. In some examples, the first type of SSS transmitted in the dedicated radio frequency spectrum band or the second type of SSS transmitted in the dedicated radio frequency spectrum band may be used as the first type of synchronization signal, the second type of synchronization signal, or the third type of synchronization signal transmitted in the shared radio frequency spectrum band. In some examples, the first type of synchronization signal, the second type of synchronization signal, or the third type of synchronization signal transmitted in the shared radio frequency spectrum band may be different from the first type of SSS transmitted in the dedicated radio frequency spectrum band or the second type of SSS transmitted in the dedicated radio frequency spectrum band. For example, a new sequence or sequences may be defined for the first type of synchronization signal, the second type of synchronization signal, or the third type of synchronization signal transmitted in the shared radio frequency spectrum band.

Figure 2:
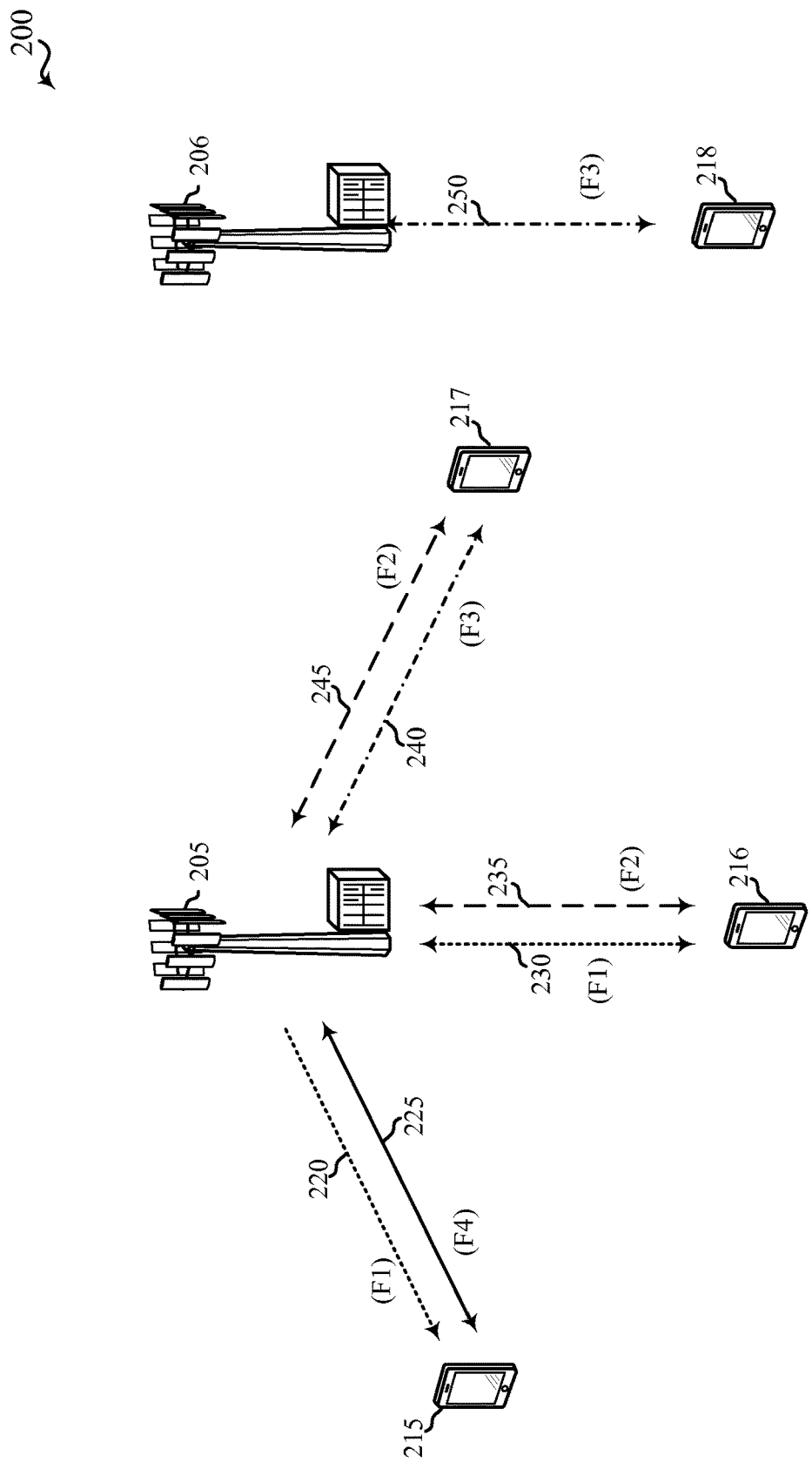
FIG. 2 shows a wireless communication system in which LTE/LTE-A may be deployed under different scenarios using a shared radio frequency spectrum band, in accordance with aspects of the present disclosure.

FIG. 2 shows a wireless communication system 200 in which LTE/LTE-A may be deployed under different scenarios using a shared radio frequency spectrum band, in accordance with aspects of the present disclosure. More specifically, FIG. 2 illustrates examples of a supplemental downlink mode (also referred to as a licensed assisted access mode), a carrier aggregation mode, and a standalone mode in which LTE/LTE-A is deployed using a shared radio frequency spectrum band. The wireless communication system 200 may be an example of portions of wireless communication system 100 described with reference to FIG. 1. The wireless communication system 200 may include, a first base station 205 and a second base station 206, which may be examples of aspects of one or more of the base stations 105 described with reference to FIG. 1, while a first UE 215, a second UE 216, a third UE 217, and a fourth UE 218 may be examples of aspects of one or more of the UEs 115 described with reference to FIG. 1.

In the example of a supplemental downlink mode (e.g., a licensed assisted access mode) in the wireless communication system 200, the first base station 205 may transmit OFDMA waveforms to the first UE 215 using a downlink channel 220. The downlink channel 220 may be associated with a frequency F1 in a shared radio frequency spectrum band. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a dedicated radio frequency spectrum band. The downlink channel 220 in the shared radio frequency spectrum band and the first bidirectional link 225 in the dedicated radio frequency spectrum band may operate contemporaneously. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a mobile network operator (MNO)) that uses a dedicated radio frequency spectrum and needs to relieve some of the traffic or signaling congestion.

In one example of a carrier aggregation mode in the wireless communication system 200, the first base station 205 may transmit OFDMA waveforms to the second UE 216 using a second bidirectional link 230 and may receive OFDMA waveforms, SC-FDMA waveforms, or resource block interleaved FDMA waveforms from the second UE 216 using the second bidirectional link 230. The second bidirectional link 230 may be associated with the frequency F1 in the shared radio frequency spectrum band. The first base station 205 may also transmit OFDMA waveforms to the second UE 216 using a third bidirectional link 235 and may receive SC-FDMA waveforms from the second UE 216 using the third bidirectional link 235. The third bidirectional link 235 may be associated with a frequency F2 in a dedicated radio frequency spectrum band. The second bidirectional link 230 may provide a downlink and uplink capacity offload for the first base station 205. Like the supplemental downlink (e.g., the licensed assisted access mode) described above, this scenario may occur with any service provider (e.g., Mobile Network Operator (MNO)) that uses a dedicated radio frequency spectrum and needs to relieve some of the traffic or signaling congestion.

In another example of a carrier aggregation mode in the wireless communication system 200, the first base station 205 may transmit OFDMA waveforms to the third UE 217 using a fourth bidirectional link 240 and may receive OFDMA waveforms, SC-FDMA waveforms, or resource block interleaved waveforms from the third UE 217 using the fourth bidirectional link 240. The fourth bidirectional link 240 may be associated with a frequency F3 in the shared radio frequency spectrum band. The first base station 205 may also transmit OFDMA waveforms to the third UE 217 using a fifth bidirectional link 245 and may receive SC-FDMA waveforms from the third UE 217 using the fifth bidirectional link 245. The fifth bidirectional link 245 may be associated with the frequency F2 in the dedicated radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in a dedicated radio frequency spectrum band and use a shared radio frequency spectrum band for capacity offload.

As described above, a type of service provider that may benefit from the capacity offload offered by using LTE/LTE-A in a shared radio frequency spectrum band is a traditional MNO having access rights to an LTE/LTE-A dedicated radio frequency spectrum band. For these service providers, an operational example may include a bootstrapped mode (e.g., supplemental downlink (e.g., licensed assisted access), carrier aggregation) that uses the LTE/LTE-A primary component carrier (PCC) on the dedicated radio frequency spectrum band and at least one secondary component carrier (SCC) on the shared radio frequency spectrum band.

In the carrier aggregation mode, data and control may, for example, be communicated in the dedicated radio frequency spectrum band (e.g., via first bidirectional link 225, third bidirectional link 235, and fifth bidirectional link 245) while data may, for example, be communicated in the shared radio frequency spectrum band (e.g., via second bidirectional link 230 and fourth bidirectional link 240). The carrier aggregation mechanisms supported when using a shared radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 206 may transmit OFDMA waveforms to the fourth UE 218 using a bidirectional link 250 and may receive OFDMA waveforms, SC-FDMA waveforms, or resource block interleaved FDMA waveforms from the fourth UE 218 using the bidirectional link 250. The bidirectional link 250 may be associated with the frequency F3 in the shared radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a dedicated radio frequency spectrum band.

In some examples, a transmitting apparatus such as one of the base stations 105 described with reference to FIG. 1, first base station 205 or second base station 206 described with reference to FIG. 2, one of the UEs 115 described with reference to FIG. 1, or first UE 215, second UE 216, third UE 217, or fourth UE 218 described with reference to FIG. 2, may use a gating interval to gain access to a channel of a shared radio frequency spectrum band (e.g., to a physical channel of the shared radio frequency spectrum band). In some examples, the gating interval may be periodic. For example, the periodic gating interval may be synchronized with at least one boundary of an LTE/LTE-A radio interval. The gating interval may define the application of a contention-based protocol, such as an LBT protocol based at least in part on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure. The outcome of the CCA procedure may indicate to the transmitting apparatus whether a channel of a shared radio frequency spectrum band is available or in use for the gating interval (also referred to as an LBT radio frame). When a CCA procedure indicates that the channel is available for a corresponding LBT radio frame (e.g., "clear" for use), the transmitting apparatus may reserve or use the channel of the shared radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

Figure 3:
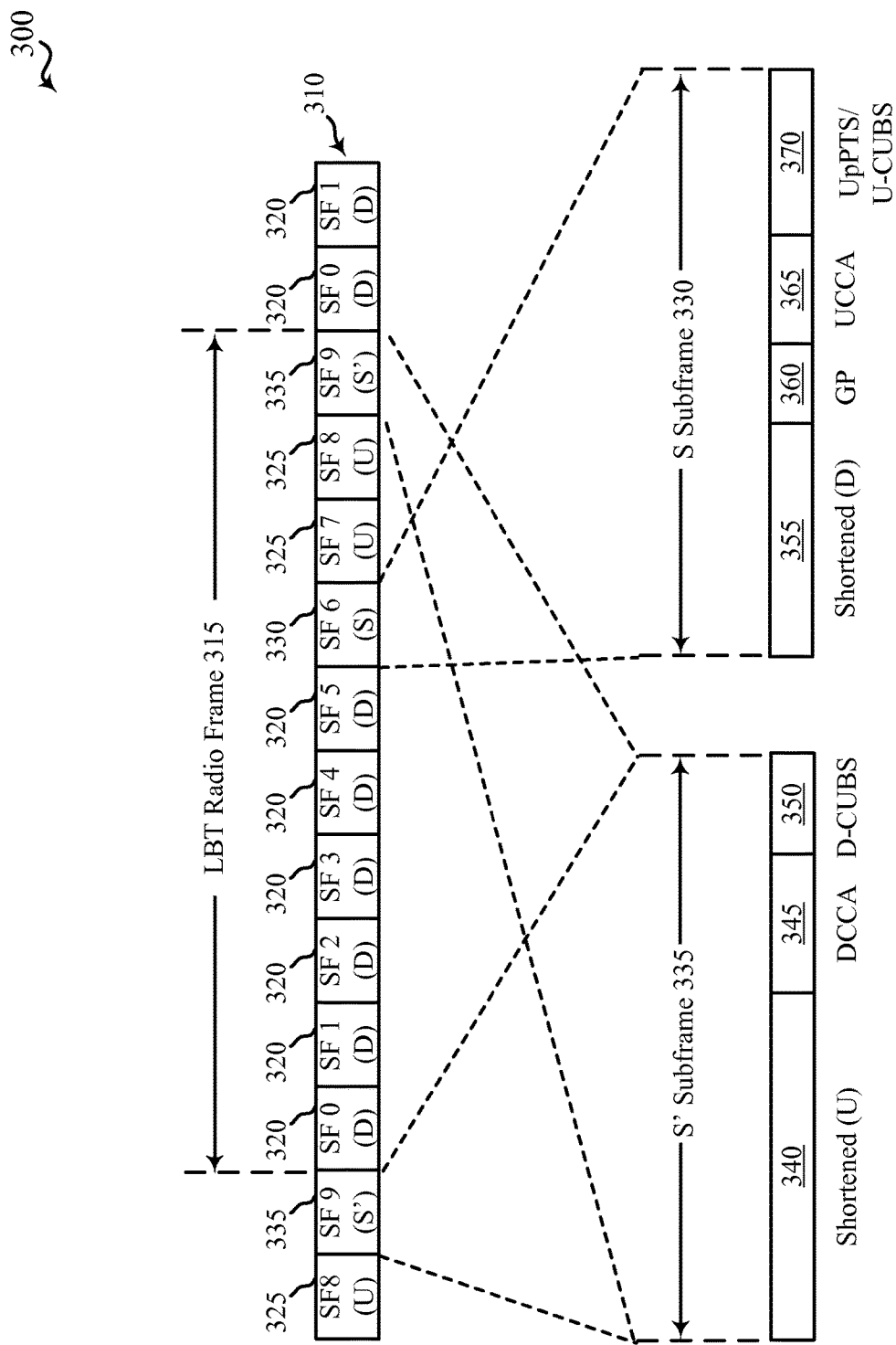
FIG. 3 shows an example of a wireless communication over a shared radio frequency spectrum band, in accordance with aspects of the present disclosure.

FIG. 3 shows an example 300 of a wireless communication 310 over a shared radio frequency spectrum band, in accordance with aspects of the present disclosure. In some examples, the wireless communication 310 may include a transmission of one or more uplink component carriers, which uplink component carrier(s) may be transmitted, for example, as part of a transmission made according to the supplemental downlink mode (e.g., the licensed assisted access mode), the carrier aggregation mode, or the standalone mode described with reference to FIG. 2.

In some examples, an LBT radio frame 315 of the wireless communication 310 may have a duration of ten milliseconds and include a number of downlink (D) subframes 320, a number of uplink (U) subframes 325, and two types of special subframes, an S subframe 330 and an S' subframe 335. The S subframe 330 may provide a transition between downlink subframes 320 and uplink subframes 325, while the S' subframe 335 may provide a transition between uplink subframes 325 and downlink subframes 320 and, in some examples, a transition between LBT radio frames.

During a second portion 345 of the S' subframe 335, a downlink clear channel assessment (DCCA) procedure may be performed by one or more base stations, such as one or more of the base stations 105 described with reference to FIG. 1, or first base station 205 or second base station 206 described with reference to FIG. 2, to reserve, for a period of time, a channel of the shared radio frequency spectrum band over which the wireless communication 310 occurs. Following a successful DCCA procedure by a base station during the second portion 345 of the S' subframe 335, the base station may transmit a channel usage beacon signal (CUBS) (e.g., a downlink CUBS (D-CUBS)) during a third portion 350 of the S' subframe 335 to provide an indication to other base stations or apparatuses (e.g., UEs, Wi-Fi access points, etc.) that the base station has reserved the channel. In some examples, a D-CUBS may be transmitted using a plurality of interleaved resource blocks. Transmitting a D-CUBS in this manner may enable the D-CUBS to occupy at least a percentage of the available frequency bandwidth of the shared radio frequency spectrum band and satisfy one or more regulatory requirements (e.g., a requirement that transmissions over the shared radio frequency spectrum band occupy at least 80% of the available frequency bandwidth). The D-CUBS may in some examples take a form similar to that of an LTE/LTE-A cell-specific reference signal (CRS) or a channel state information reference signal (CSI-RS). In some examples following an unsuccessful DCCA procedure by a base station during the second portion 345 of the S' subframe 335, the base station may optionally not transmit a D-CUBS during the third portion 350 of the S' subframe 335.

The S' subframe 335 may include a plurality of orthogonal frequency-division multiplexed (OFDM) symbol periods (e.g., 14 OFDM symbol periods). A first portion 340 of the S' subframe 335 may be used by a number of UEs as a shortened uplink (U) period. The second portion 345 of the S' subframe 335 may be used for the DCCA procedure. The third portion 350 of the S' subframe 335 may be used by one or more base stations that successfully contend for access to the channel of the shared radio frequency spectrum band to transmit the D-CUBS.

During a third portion 365 of the S subframe 330, an uplink CCA (UCCA) procedure may be performed by one or more UEs, such as one or more of the UEs 115 described with reference to FIG. 1, or first UE 215, second UE 216, third UE 217, or fourth UE 218 described with reference to FIG. 2, to reserve, for a period of time, the channel over which the wireless communication 310 occurs. Following a successful UCCA procedure by a UE in the third portion 365 of the S subframe 330, the UE may transmit an uplink CUBS (U-CUBS) during a fourth portion 370 of the S subframe 330 to provide an indication to other UEs or apparatuses (e.g., base stations, Wi-Fi access points, etc.) that the UE has reserved the channel. In some examples, a U-CUBS may be transmitted using a plurality of interleaved resource blocks. Transmitting a U-CUBS in this manner may enable the U-CUBS to occupy at least a percentage of the available frequency bandwidth of the shared radio frequency spectrum band and satisfy one or more regulatory requirements (e.g., a requirement that transmissions over the shared radio frequency spectrum band occupy at least 80% of the available frequency bandwidth). The U-CUBS may in some examples take a form similar to that of an LTE/LTE-A CRS or CSI-RS. In some examples following an unsuccessful UCCA procedure by a UE in the third portion 365 of the S subframe 330, the UE may optionally not transmit a U-CUBS in the fourth portion 370 of the S subframe 330.

The S subframe 330 may include a plurality of OFDM symbol periods (e.g., 14 OFDM symbol periods). A first portion 355 of the S subframe 330 may be used by a number of base stations as a shortened downlink (D) period. A second portion 360 of the S subframe 330 may be used as a guard period (GP). The third portion of the S subframe 330 may be used for the UCCA procedure. The fourth portion 370 of the S subframe 330 may be used by one or more UEs that successfully contend for access to the channel of the shared radio frequency spectrum band as an uplink pilot time slot (UpPTS) or to transmit the U-CUBS.

In some examples, the DCCA procedure or the UCCA procedure may include the performance of a single CCA procedure. In other examples, the DCCA procedure or the UCCA procedure may include the performance of an extended CCA procedure. An extended CCA procedure may include any number of CCA procedures, and additionally or alternately in some examples may include a random number of CCA procedures. The terms DCCA procedure and UCCA procedure are therefore intended to be broad enough to cover the performance of either a single CCA procedure or an extended CCA procedure having any number of CCA procedures. The selection of a single CCA procedure or an extended CCA procedure, for performance by a base station or a UE during an LBT radio frame, may be based at least in part on LBT rules. In some cases, the term CCA procedure may be used in this disclosure, in a general sense, to refer to either a single CCA procedure or an extended CCA procedure.

By way of example, the LBT radio frame 315 has a DDDDDDSUUS' TDD frame structure. In other examples, an LBT radio frame may have a different TDD frame structure. For example, an LBT frame may have one of the TDD frame structures used in enhanced/evolved interference mitigation and traffic adaptation (eIMTA).

Figure 4:
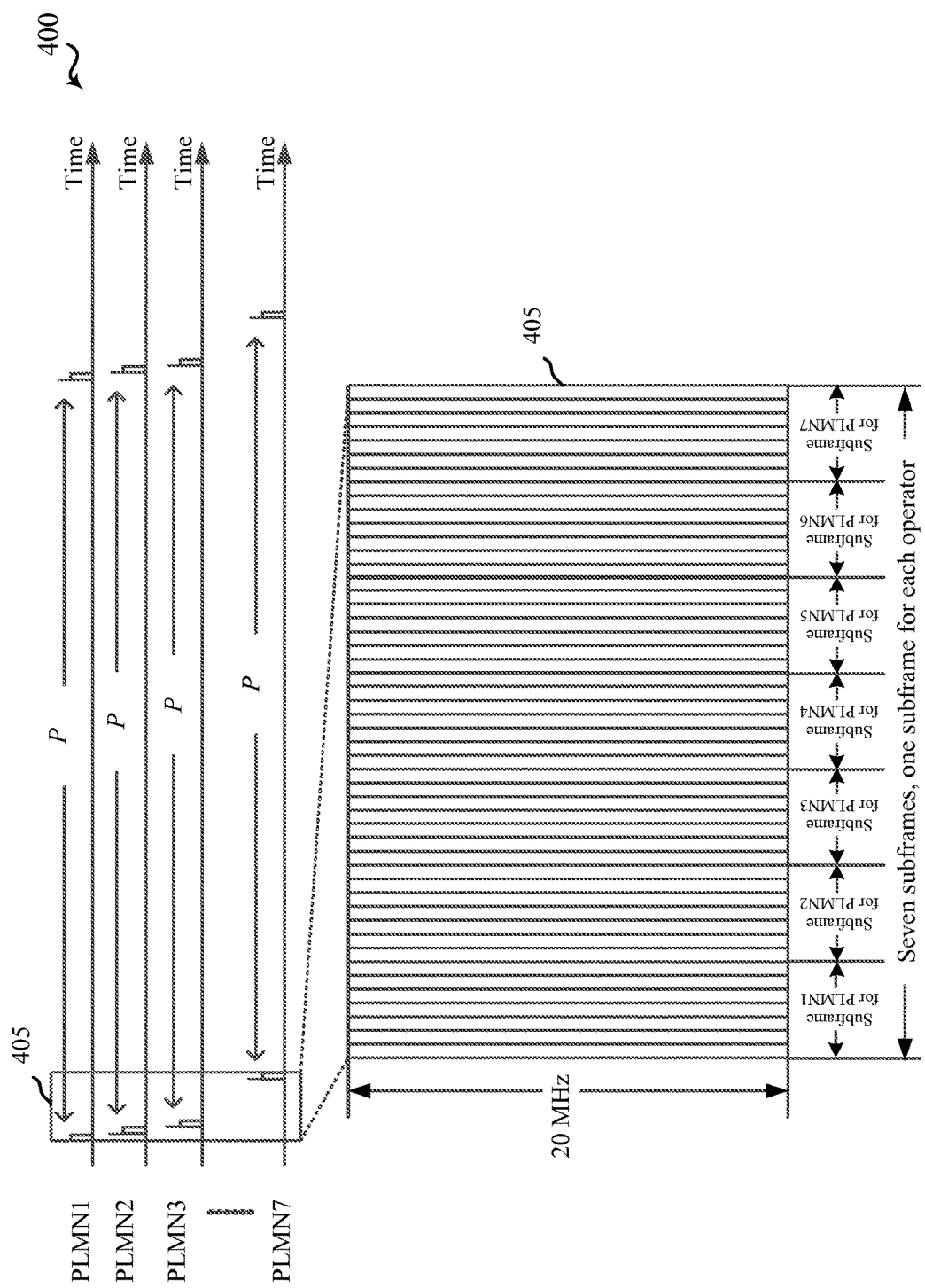
FIG. 4 shows an example resource allocation for CCA-Exempt Transmissions (CETs) in a shared radio frequency spectrum band, in accordance with aspects of the present disclosure.

FIG. 4 shows an example 400 of CCA-Exempt Transmissions (CETs) in a shared radio frequency spectrum band, in accordance with aspects of the present disclosure. A CET may be made without winning a contention for access to the shared radio frequency spectrum band and, in some examples, without performing a CCA (e.g., a DCCA or UCCA). Instead, an operator may be exempted from performing a CCA for the purpose of transmitting a CET.

Example 400 includes an allocation of resources 405 for CETs which may be made, for example, at a periodicity P. In various examples, an allocation of resources 405 may be made once every eighty milliseconds (80 ms) or once every CET period, where the CET period may have a configurable periodicity. Each of a number of operators (e.g., different PLMNs) in the shared radio frequency spectrum band may be provided a separate subframe (shown) or subframes (not shown) for transmitting CETs. A subframe in which a CET may be transmitted may be referred to as a preconfigured CET occasion. By way of example, FIG. 4 shows adjacent CET subframes for seven different operators (e.g., operators PLMN1, PLMN2, . . . , PLMN7). Such a CET transmission framework may be applicable (e.g., separately applicable) to downlink or uplink transmissions between a base station and a UE (e.g., in the form of preconfigured uplink CET (U-CET) occasions or preconfigured downlink CET (D-CET) occasions). In some examples, a D-CET occasion may be used by a base station for transmitting one or more synchronization signals or system information.

Although FIG. 4 illustrates an example resource allocation for CETs of synchronous operators, resources may also be allocated for CETs of second type of operators.

Figure 5:
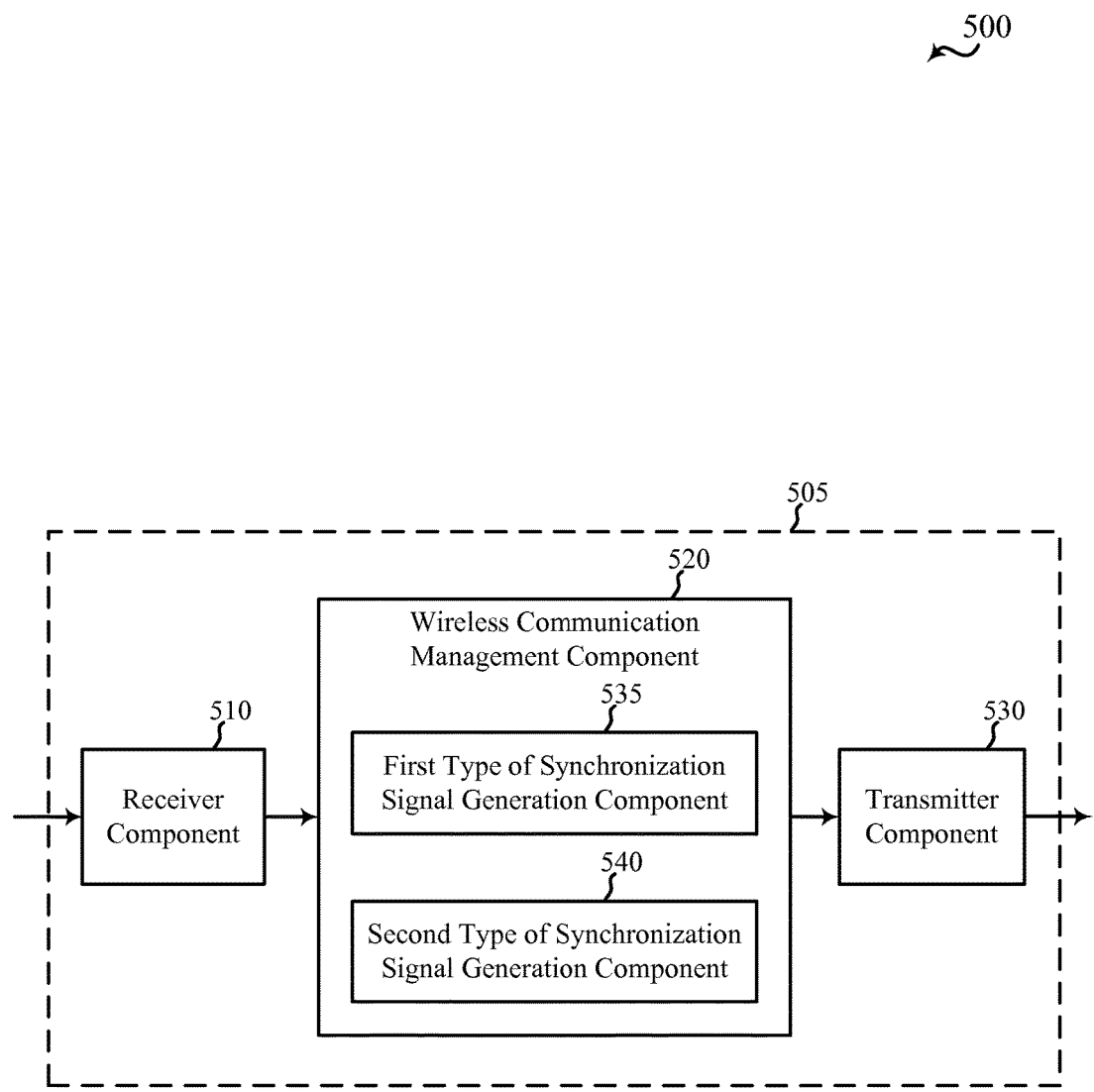
FIG. 5 shows a block diagram of an apparatus for use in wireless communication, in accordance with aspects of the present disclosure.

FIG. 5 shows a block diagram 500 of an apparatus 505 for use in wireless communication, in accordance with aspects of the present disclosure. The apparatus 505 may be an example of aspects of one or more of the base stations 105 described with reference to FIG. 1, or first base station 205 or second base station 206 described with reference to FIG. 2. The apparatus 505 may also be or include a processor. The apparatus 505 may include a receiver component 510, a wireless communication management component 520, or a transmitter component 530. Each of these components may be in communication with each other.

The components of the apparatus 505 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver component 510 may include at least one radio frequency (RF) receiver, such as at least one RF receiver operable to receive transmissions over a dedicated radio frequency spectrum band or a shared radio frequency spectrum band. The dedicated radio frequency spectrum band may include a radio frequency spectrum band for which one or more transmitting apparatuses may not be required to contend for access (e.g., a radio frequency spectrum band licensed to one or more users, such as a licensed radio frequency spectrum band usable for LTE/LTE-A communications). The shared radio frequency spectrum band may include a radio frequency spectrum band for which one or more transmitting apparatuses may need to contend for access (e.g., a radio frequency spectrum band that is available for unlicensed use, such as Wi-Fi use, or a radio frequency spectrum band that is available for use by one or more operators in an equally shared or prioritized manner). In some examples, the dedicated radio frequency spectrum band or the shared radio frequency spectrum band may be used for LTE/LTE-A communications, as described, for example, with reference to FIG. 1, 2, 3, or 4. The receiver component 510 may be used to receive various types of data or control signals (i.e., transmissions) over one or more communication links of a wireless communication system, such as one or more communication links of wireless communication system 100 described with reference to FIG. 1 or wireless communication system 200 described with reference to FIG. 2. The communication links may be established over the dedicated radio frequency spectrum band or the shared radio frequency spectrum band.

In some examples, the transmitter component 530 may include at least one RF transmitter, such as at least one RF transmitter operable to transmit over the dedicated radio frequency spectrum band or the shared radio frequency spectrum band. The transmitter component 530 may be used to transmit various types of data or control signals (i.e., transmissions) over one or more communication links of a wireless communication system, such as one or more communication links of wireless communication system 100 described with reference to FIG. 1 or wireless communication system 200 described with reference to FIG. 2. The communication links may be established over the dedicated radio frequency spectrum band or the shared radio frequency spectrum band.

In some examples, the wireless communication management component 520 may be used to manage one or more aspects of wireless communication for the apparatus 505. In some examples, the wireless communication management component 520 may include a first type of synchronization signal generation component 535 or a second type of synchronization signal generation component 540.

In some examples, the first type of synchronization signal generation component 535 may be used to generate a first type of synchronization signal based at least in part on a first type of transmission in the shared radio frequency spectrum band.

In some examples, the second type of synchronization signal generation component 540 may be used to generate a second type of synchronization signal based at least in part on a second type of transmission in the shared radio frequency spectrum band. The second type of synchronization signal may be different from the first type of synchronization signal.

In some examples, the first type of synchronization signal may include a first type of secondary synchronization signal (e.g., a Type 1 secondary synchronization signal (SSS)), where the first type of SSS may be transmitted in a first half (e.g., a first 5 milliseconds) of a radio frame (e.g., an LTE/LTE-A radio frame) transmitted in the dedicated radio frequency spectrum band. In at least some of these examples, the second type of synchronization signal may include a second type of SSS (e.g., a Type 2 LTE/LTE-A SSS), where the second type of SSS may be transmitted in a second half (e.g., a second 5 milliseconds) of the radio frame transmitted in the dedicated radio frequency spectrum band.

In some examples, the second type of synchronization signal may include the first type of SSS. In at least some of these examples, the first type of synchronization signal may include the second type of SSS.

Figure 6:
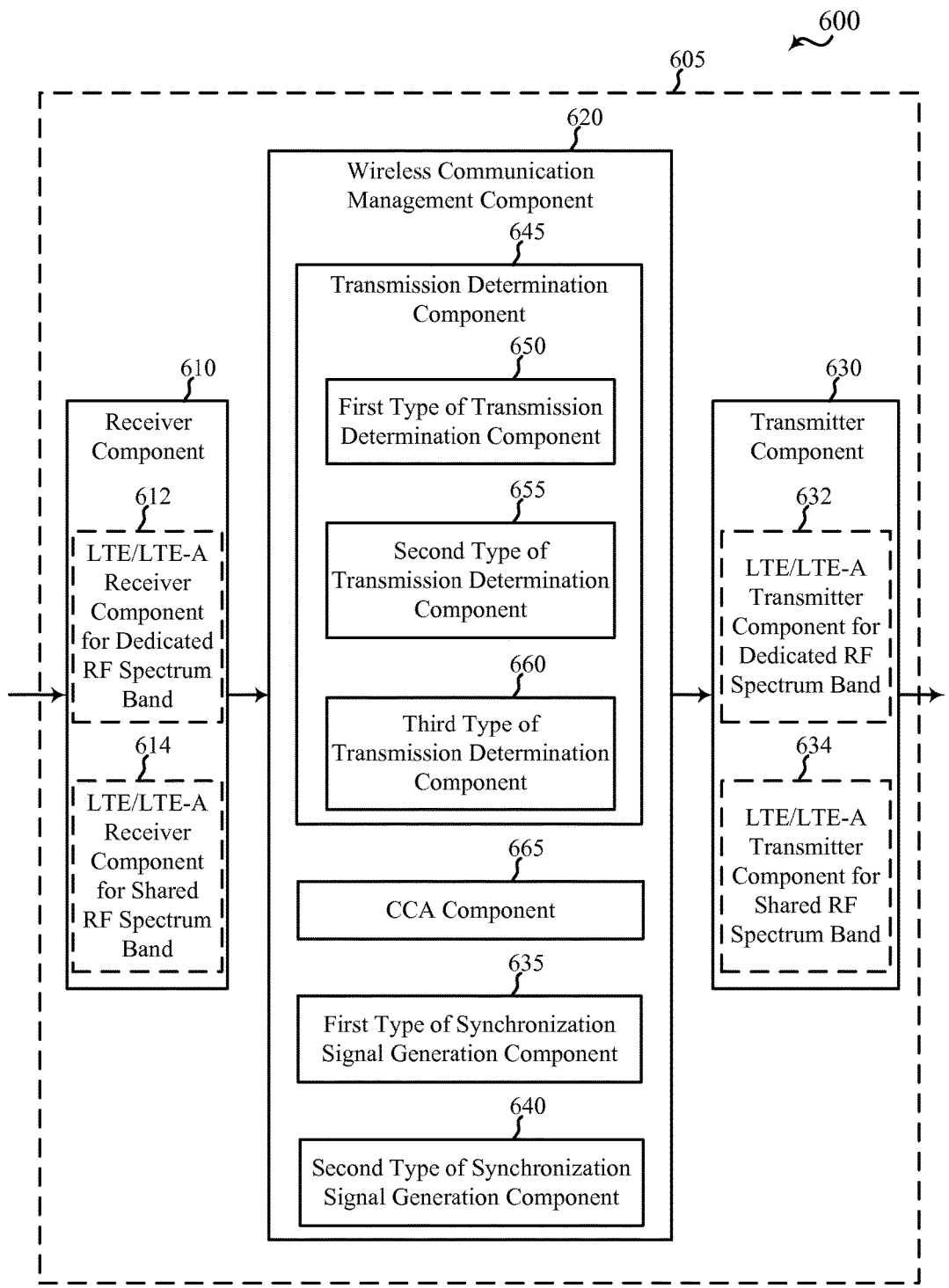
FIG. 6 shows a block diagram of an apparatus for use in wireless communication, in accordance with aspects of the present disclosure.

FIG. 6 shows a block diagram 600 of an apparatus 605 for use in wireless communication, in accordance with aspects of the present disclosure. The apparatus 605 may be an example of aspects of one or more of the base stations 105 described with reference to FIG. 1, first base station 205 or second base station 206 described with reference to FIG. 2, or apparatus 505 described with reference to FIG. 5. The apparatus 605 may also be or include a processor. The apparatus 605 may include a receiver component 610, a wireless communication management component 620, or a transmitter component 630. Each of these components may be in communication with each other.

The components of the apparatus 605 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver component 610 may include at least one RF receiver, such as at least one RF receiver operable to receive transmissions over a dedicated radio frequency spectrum band or a shared radio frequency spectrum band. The dedicated radio frequency spectrum band may include a radio frequency spectrum band for which one or more transmitting apparatuses may not be required to contend for access (e.g., a radio frequency spectrum band licensed to one or more users, such as a licensed radio frequency spectrum band usable for LTE/LTE-A communications). The shared radio frequency spectrum band may include a radio frequency spectrum band for which one or more transmitting apparatuses may need to contend for access (e.g., a radio frequency spectrum band that is available for unlicensed use, such as Wi-Fi use, or a radio frequency spectrum band that is available for use by one or more operators in an equally shared or prioritized manner). In some examples, the dedicated radio frequency spectrum band or the shared radio frequency spectrum band may be used for LTE/LTE-A communications, as described, for example, with reference to FIG. 1 or 2. The receiver component 610 may in some cases include separate receivers for the dedicated radio frequency spectrum band and the shared radio frequency spectrum band. The separate receivers may, in some examples, take the form of an LTE/LTE-A receiver component for communicating over the dedicated radio frequency spectrum band (e.g., LTE/LTE-A receiver component for dedicated RF spectrum band 612), and an LTE/LTE-A receiver component for communicating over the shared radio frequency spectrum band (e.g., LTE/LTE-A receiver component for shared RF spectrum band 614). The receiver component 610, including the LTE/LTE-A receiver component for dedicated RF spectrum band 612 or the LTE/LTE-A receiver component for shared RF spectrum band 614, may be used to receive various types of data or control signals (i.e., transmissions) over one or more communication links of a wireless communication system, such as one or more communication links of wireless communication system 100 described with reference to FIG. 1 or wireless communication system 200 described with reference to FIG. 2. The communication links may be established over the dedicated radio frequency spectrum band or the shared radio frequency spectrum band.

In some examples, the transmitter component 630 may include at least one RF transmitter, such as at least one RF transmitter operable to transmit over the dedicated radio frequency spectrum band or the shared radio frequency spectrum band. The transmitter component 630 may in some cases include separate transmitters for the dedicated radio frequency spectrum band and the shared radio frequency spectrum band. The separate transmitters may, in some examples, take the form of an LTE/LTE-A transmitter component for communicating over the dedicated radio frequency spectrum band (e.g., LTE/LTE-A transmitter component for dedicated RF spectrum band 632), and an LTE/LTE-A transmitter component for communicating over the shared radio frequency spectrum band (e.g., LTE/LTE-A transmitter component for shared RF spectrum band 634). The transmitter component 630, including the LTE/LTE-A transmitter component for dedicated RF spectrum band 632 or the LTE/LTE-A transmitter component for shared RF spectrum band 634, may be used to transmit various types of data or control signals (i.e., transmissions) over one or more communication links of a wireless communication system, such as one or more communication links of wireless communication system 100 described with reference to FIG. 1 or wireless communication system 200 described with reference to FIG. 2. The communication links may be established over the first radio frequency spectrum band or the second radio frequency spectrum band.

In some examples, the wireless communication management component 620 may be used to manage one or more aspects of wireless communication for the apparatus 605. In some examples, the wireless communication management component 620 may include a transmission determination component 645, a CCA component 665, a first type of synchronization signal generation component 635, or a second type of synchronization signal generation component 640.

In some examples, the transmission determination component 645 may be used to determine a type of transmission available to the apparatus 605. The transmission determination component 645 may include a first type of transmission determination component 650, a second type of transmission determination component 655, or a third type of transmission determination component 660.

In some examples, the first type of transmission determination component 650 may be used to determine whether a transmission (e.g., part or all of a downlink subframe) in the shared radio frequency spectrum band is a discovery signal transmission (e.g., a first type of transmission) in the shared radio frequency spectrum band, which in some examples may be a CET. In some examples, the second type of transmission determination component 655 may be used to determine whether a transmission in the shared radio frequency spectrum band is a second type of transmission (e.g., an opportunistic transmission such as a subframe identified for asynchronous transmission of a synchronization signal). In some examples, the third type of transmission determination component 660 may be used to determine whether a transmission in the shared radio frequency spectrum band is a third type of transmission (e.g., an opportunistic transmission such as a subframe of an LBT frame or radio frame, which may be a beginning subframe of an LBT frame or a radio frame).

In some examples, the CCA component 665 may be used to contend for access to the shared radio frequency spectrum band. In some examples, the CCA component 665 may contend for access to the shared radio frequency spectrum band by performing a UCCA, as described, for example, with reference to FIG. 3. Upon winning a contention for access to the shared radio frequency spectrum band, the CCA component 665 may enable the wireless communication management component 620 to transmit a CUBS in the shared radio frequency spectrum band, and subsequently, transmit data or control signals (e.g., a synchronization signal) in the shared radio frequency spectrum band.

In some examples, the first type of synchronization signal generation component 635 may be used to generate a first type of synchronization signal based at least in part on a discovery signal transmission identified by the first type of transmission determination component 650. In some examples, the first type of synchronization signal generation component 635 may be used to generate the first type of synchronization signal based at least in part on an opportunistic transmission, such as a subframe of an LBT frame or radio frame identified by the third type of transmission determination component 660, and based at least in part on the CCA component 665 winning contention for access to the shared radio frequency spectrum band.

In some examples, the second type of synchronization signal generation component 640 may be used to generate a second type of synchronization signal based at least in part on an opportunistic transmission, such as a subframe identified for asynchronous transmission of a synchronization signal by the second type of transmission determination component 655, and based at least in part on the CCA component 665 winning contention for access to the shared radio frequency spectrum band. The second type of synchronization signal may be different from the first type of synchronization signal.

In some examples, the first type of synchronization signal may include a first type of secondary synchronization signal (e.g., a Type 1 secondary synchronization signal (SSS)), which first type of SSS may be transmitted in a first half (e.g., a first 5 milliseconds) of a radio frame (e.g., an LTE/LTE-A radio frame) transmitted in the dedicated radio frequency spectrum band. In at least some of these examples, the second type of synchronization signal may include a second type of SSS (e.g., a Type 2 LTE/LTE-A SSS), which second type of SSS may be transmitted in a second half (e.g., a second 5 milliseconds) of the radio frame transmitted in the dedicated radio frequency spectrum band.

In some examples, the second type of synchronization signal may include the first type of SSS. In at least some of these examples, the first type of synchronization signal may include the second type of SSS.

Figure 7:
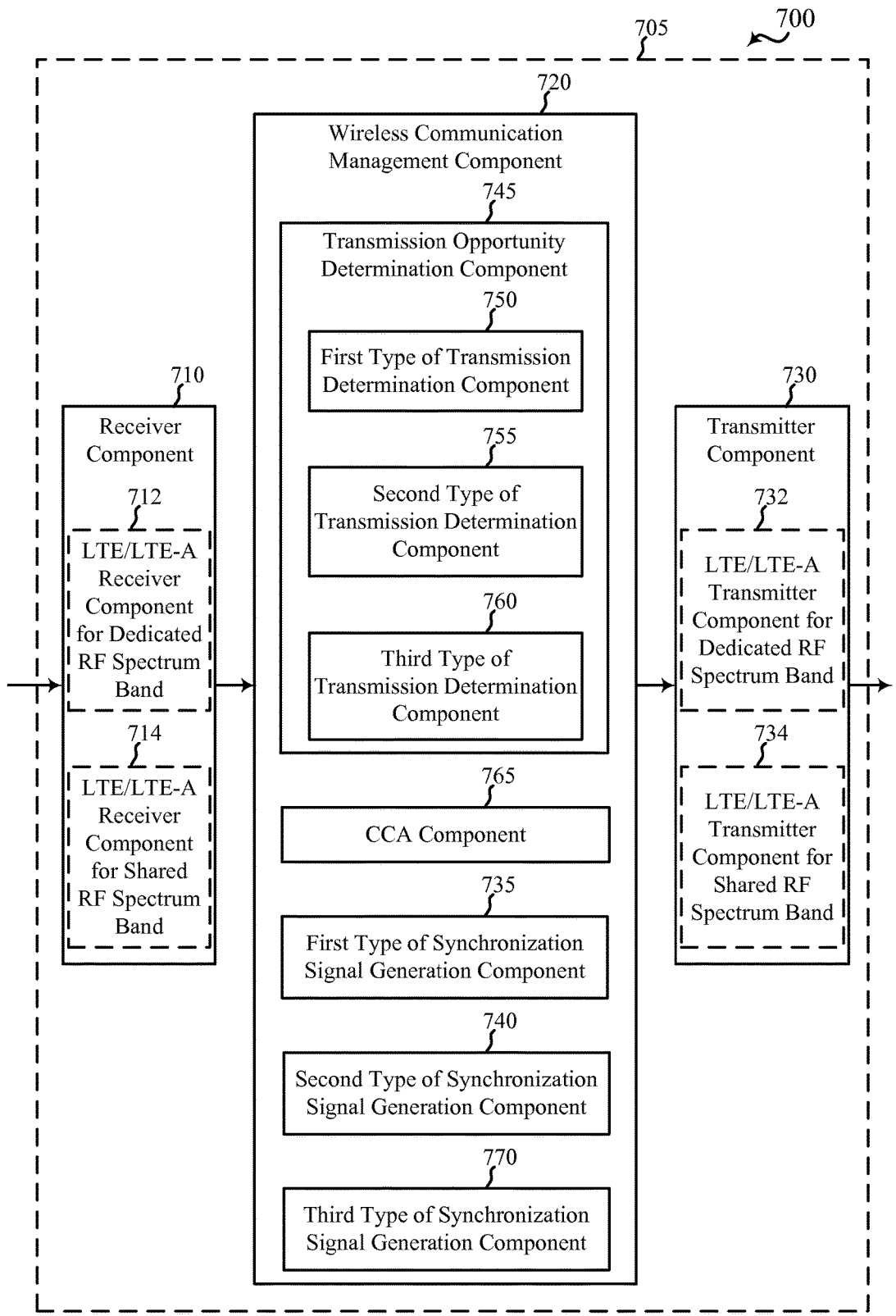
FIG. 7 shows a block diagram of an apparatus for use in wireless communication, in accordance with aspects of the present disclosure.

FIG. 7 shows a block diagram 700 of an apparatus 705 for use in wireless communication, in accordance with aspects of the present disclosure. The apparatus 705 may be an example of aspects of one or more of the base stations 105 described with reference to FIG. 1, first base station 205 or second base station 206 described with reference to FIG. 2, apparatus 505 described with reference to FIG. 5, or apparatus 605 described with reference to FIG. 6. The apparatus 705 may also be or include a processor. The apparatus 705 may include a receiver component 710, a wireless communication management component 720, or a transmitter component 730. Each of these components may be in communication with each other.

The components of the apparatus 705 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver component 710 may include at least one RF receiver, such as at least one RF receiver operable to receive transmissions over a dedicated radio frequency spectrum band or a shared radio frequency spectrum band. The dedicated radio frequency spectrum band may include a radio frequency spectrum band for which one or more transmitting apparatuses may not be required to contend for access (e.g., a radio frequency spectrum band licensed to one or more users, such as a licensed radio frequency spectrum band usable for LTE/LTE-A communications). The shared radio frequency spectrum band may include a radio frequency spectrum band for which one or more transmitting apparatuses may need to contend for access (e.g., a radio frequency spectrum band that is available for unlicensed use, such as Wi-Fi use, or a radio frequency spectrum band that is available for use by one or more operators in an equally shared or prioritized manner). In some examples, the dedicated radio frequency spectrum band or the shared radio frequency spectrum band may be used for LTE/LTE-A communications, as described, for example, with reference to FIG. 1 or 2. The receiver component 710 may in some cases include separate receivers for the dedicated radio frequency spectrum band and the shared radio frequency spectrum band. The separate receivers may, in some examples, take the form of an LTE/LTE-A receiver component for communicating over the dedicated radio frequency spectrum band (e.g., LTE/LTE-A receiver component for dedicated RF spectrum band 712), and an LTE/LTE-A receiver component for communicating over the shared radio frequency spectrum band (e.g., LTE/LTE-A receiver component for shared RF spectrum band 714). The receiver component 710, including the LTE/LTE-A receiver component for dedicated RF spectrum band 712 or the LTE/LTE-A receiver component for shared RF spectrum band 714, may be used to receive various types of data or control signals (i.e., transmissions) over one or more communication links of a wireless communication system, such as one or more communication links of wireless communication system 100 described with reference to FIG. 1 or wireless communication system 200 described with reference to FIG. 2. The communication links may be established over the dedicated radio frequency spectrum band or the shared radio frequency spectrum band.

In some examples, the transmitter component 730 may include at least one RF transmitter, such as at least one RF transmitter operable to transmit over the dedicated radio frequency spectrum band or the shared radio frequency spectrum band. The transmitter component 730 may in some cases include separate transmitters for the dedicated radio frequency spectrum band and the shared radio frequency spectrum band. The separate transmitters may, in some examples, take the form of an LTE/LTE-A transmitter component for communicating over the dedicated radio frequency spectrum band (e.g., LTE/LTE-A transmitter component for dedicated RF spectrum band 732), and an LTE/LTE-A transmitter component for communicating over the shared radio frequency spectrum band (e.g., LTE/LTE-A transmitter component for shared RF spectrum band 734). The transmitter component 730, including the LTE/LTE-A transmitter component for dedicated RF spectrum band 732 or the LTE/LTE-A transmitter component for shared RF spectrum band 734, may be used to transmit various types of data or control signals (i.e., transmissions) over one or more communication links of a wireless communication system, such as one or more communication links of wireless communication system 100 described with reference to FIG. 1 or wireless communication system 200 described with reference to FIG. 2. The communication links may be established over the first radio frequency spectrum band or the second radio frequency spectrum band.

In some examples, the wireless communication management component 720 may be used to manage one or more aspects of wireless communication for the apparatus 705. In some examples, the wireless communication management component 720 may include a transmission determination component 745, a CCA component 765, a first type of synchronization signal generation component 735, a second type of synchronization signal generation component 740, or a third type of synchronization signal generation component 770.

In some examples, the transmission determination component 745 may be used to determine a type of transmission available to the apparatus 705. The transmission determination component 745 may include a first type of transmission determination component 750, a second type of transmission determination component 755, or a third type of transmission determination component 760.

In some examples, the first type of transmission determination component 750 may be used to determine whether a transmission (e.g., part or all of a downlink subframe) in the shared radio frequency spectrum band is a discovery signal transmission (e.g., a first type of transmission) in the shared radio frequency spectrum band, which may be a CET. In some examples, the second type of transmission determination component 755 may be used to determine whether a transmission in the shared radio frequency spectrum band is a second type of transmission (e.g., an opportunistic transmission such as a subframe identified for asynchronous transmission of a synchronization signal). In some examples, the third type of transmission determination component 760 may be used to determine whether a transmission in the shared radio frequency spectrum band is a third type of transmission (e.g., an opportunistic transmission such as a subframe of an LBT frame or radio frame, which may be a beginning subframe of an LBT frame or a radio frame).

In some examples, the CCA component 765 may be used to contend for access to the shared radio frequency spectrum band. In some examples, the CCA component 765 may contend for access to the shared radio frequency spectrum band by performing a UCCA, as described, for example, with reference to FIG. 3. Upon winning a contention for access to the shared radio frequency spectrum band, the CCA component 765 may enable the wireless communication management component 720 to transmit a CUBS in the shared radio frequency spectrum band, and subsequently, transmit data or control signals (e.g., a synchronization signal) in the shared radio frequency spectrum band.

In some examples, the first type of synchronization signal generation component 735 may be used to generate a first type of synchronization signal based at least in part on a discovery signal transmission identified by the first type of transmission determination component 750.

In some examples, the second type of synchronization signal generation component 740 may be used to generate a second type of synchronization signal based at least in part on an opportunistic transmission, such as a subframe identified for asynchronous transmission of a synchronization signal by the second type of transmission determination component 755, and based at least in part on the CCA component 765 winning contention for access to the shared radio frequency spectrum band. The second type of synchronization signal may be different from the first type of synchronization signal.

In some examples, the third type of synchronization signal generation component 770 may be used to generate a third type of synchronization signal based at least in part on an opportunistic transmission, such as a subframe of an LBT frame or radio frame identified by the third type of transmission determination component 760, and based at least in part on the CCA component 765 winning contention for access to the shared radio frequency spectrum band. The third type of synchronization signal may be different from each of the first type of synchronization signal and the second type of synchronization signal.

In some examples, the first type of synchronization signal may include a first type of secondary synchronization signal (e.g., a Type 1 secondary synchronization signal (SSS)), which first type of SSS may be transmitted in a first half (e.g., a first 5 milliseconds) of a radio frame (e.g., an LTE/LTE-A radio frame) transmitted in the dedicated radio frequency spectrum band. In at least some of these examples, the second type of synchronization signal may include a second type of SSS (e.g., a Type 2 LTE/LTE-A SSS), which second type of SSS may be transmitted in a second half (e.g., a second 5 milliseconds) of the radio frame transmitted in the dedicated radio frequency spectrum band.

In some examples, the second type of synchronization signal may include the first type of SSS. In at least some of these examples, the first type of synchronization signal may include the second type of SSS.

Figure 8:
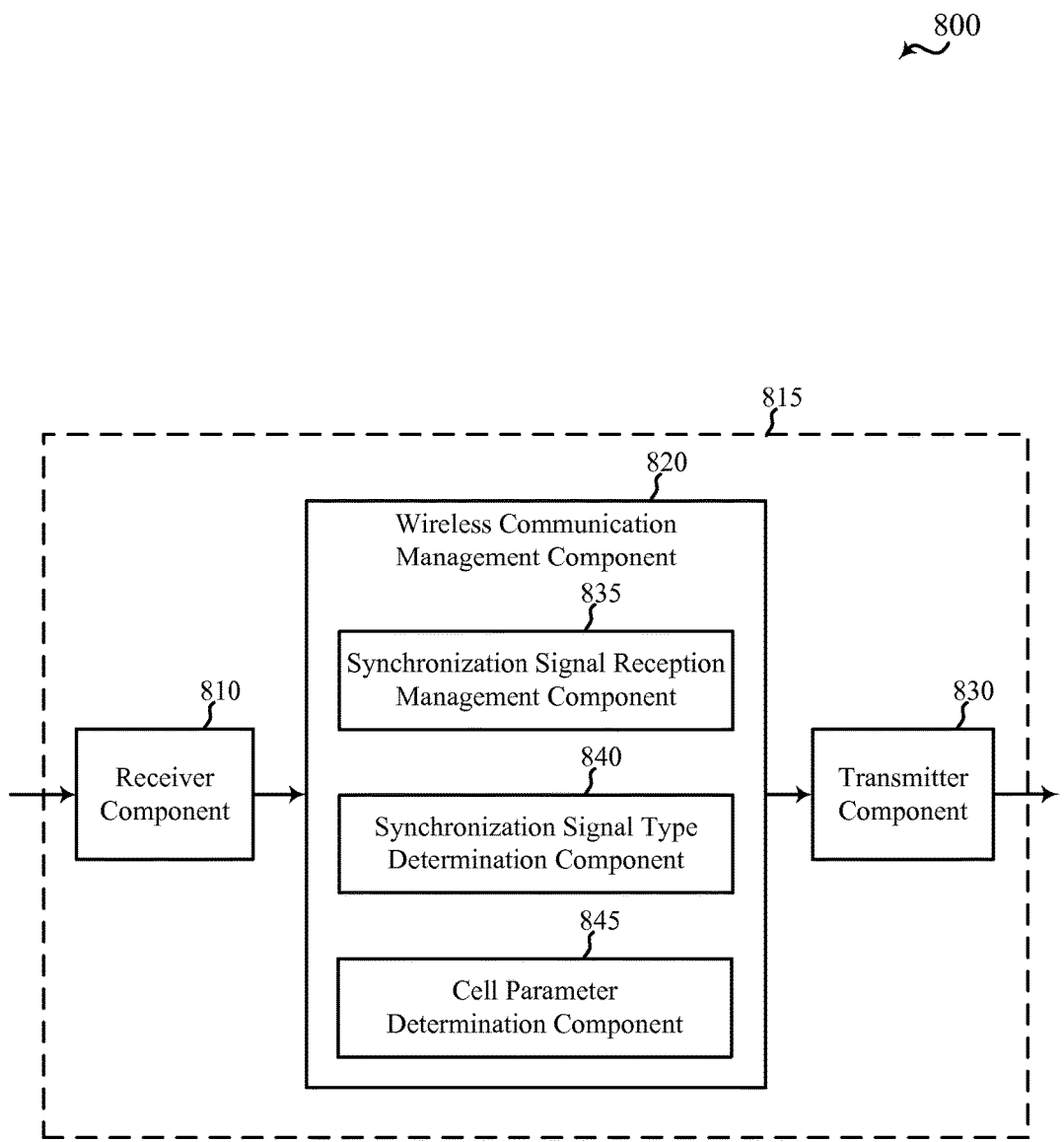
FIG. 8 shows a block diagram of an apparatus for use in wireless communication, in accordance with aspects of the present disclosure.

FIG. 8 shows a block diagram 800 of an apparatus 815 for use in wireless communication, in accordance with aspects of the present disclosure. The apparatus 815 may be an example of aspects of one or more of UEs 115 described with reference to FIG. 1, or first UE 215, second UE 216, third UE 217, or fourth UE 218 described with reference to FIG. 2. The apparatus 815 may also be or include a processor. The apparatus 815 may include a receiver component 810, a wireless communication management component 820, or a transmitter component 830. Each of these components may be in communication with each other.

The components of the apparatus 815 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver component 810 may include at least one RF receiver, such as at least one RF receiver operable to receive transmissions over a dedicated radio frequency spectrum band or a shared radio frequency spectrum band. The dedicated radio frequency spectrum band may include a radio frequency spectrum band for which one or more transmitting apparatuses may not be required to contend for access (e.g., a radio frequency spectrum band licensed to one or more users, such as a licensed radio frequency spectrum band usable for LTE/LTE-A communications). The shared radio frequency spectrum band may include a radio frequency spectrum band for which one or more transmitting apparatuses may need to contend for access (e.g., a radio frequency spectrum band that is available for unlicensed use, such as Wi-Fi use, or a radio frequency spectrum band that is available for use by one or more operators in an equally shared or prioritized manner). In some examples, the dedicated radio frequency spectrum band or the shared radio frequency spectrum band may be used for LTE/LTE-A communications, as described, for example, with reference to FIG. 1, 2, 3, or 4. The receiver component 810 may be used to receive various types of data or control signals (i.e., transmissions) over one or more communication links of a wireless communication system, such as one or more communication links of wireless communication system 100 described with reference to FIG. 1 or wireless communication system 200 described with reference to FIG. 2. The communication links may be established over the dedicated radio frequency spectrum band or the shared radio frequency spectrum band.

In some examples, the transmitter component 830 may include at least one RF transmitter, such as at least one RF transmitter operable to transmit over the dedicated radio frequency spectrum band or the shared radio frequency spectrum band. The transmitter component 830 may be used to transmit various types of data or control signals (i.e., transmissions) over one or more communication links of a wireless communication system, such as one or more communication links of wireless communication system 100 described with reference to FIG. 1 or wireless communication system 200 described with reference to FIG. 2. The communication links may be established over the dedicated radio frequency spectrum band or the shared radio frequency spectrum band.

In some examples, the wireless communication management component 820 may be used to manage one or more aspects of wireless communication for the apparatus 815. In some examples, the wireless communication management component 820 may include a synchronization signal reception management component 835, a synchronization signal type determination component 840, or a cell parameter determination component 845.

In some examples, the synchronization signal reception management component 835 may be used to receive a synchronization signal associated with a type of transmission in the shared radio frequency spectrum band.

In some examples, the synchronization signal type determination component 840 may be used to determine a type of the synchronization signal.

In some examples, the cell parameter determination component 845 may be used to determine one or more cell parameters based at least in part on the synchronization signal (e.g., based at least in part on the type of the synchronization signal identified by the synchronization signal type determination component 840. In some examples, the one or more cell parameters may include a timing of an LBT frame boundary, a timing of a radio frame boundary, a timing of a discovery signal transmission boundary, a timing of a CET period boundary, or a measurement of the energy of the synchronization signal.

In some examples, the synchronization signal may be transmitted by a base station such as one of the base stations 105 described with reference to FIG. 1, first base station 205, or second base station 206 described with reference to FIG. 2, apparatus 505 described with reference to FIG. 5, apparatus 605 described with reference to FIG. 6, or apparatus 705 described with reference to FIG. 7.

Figure 9:
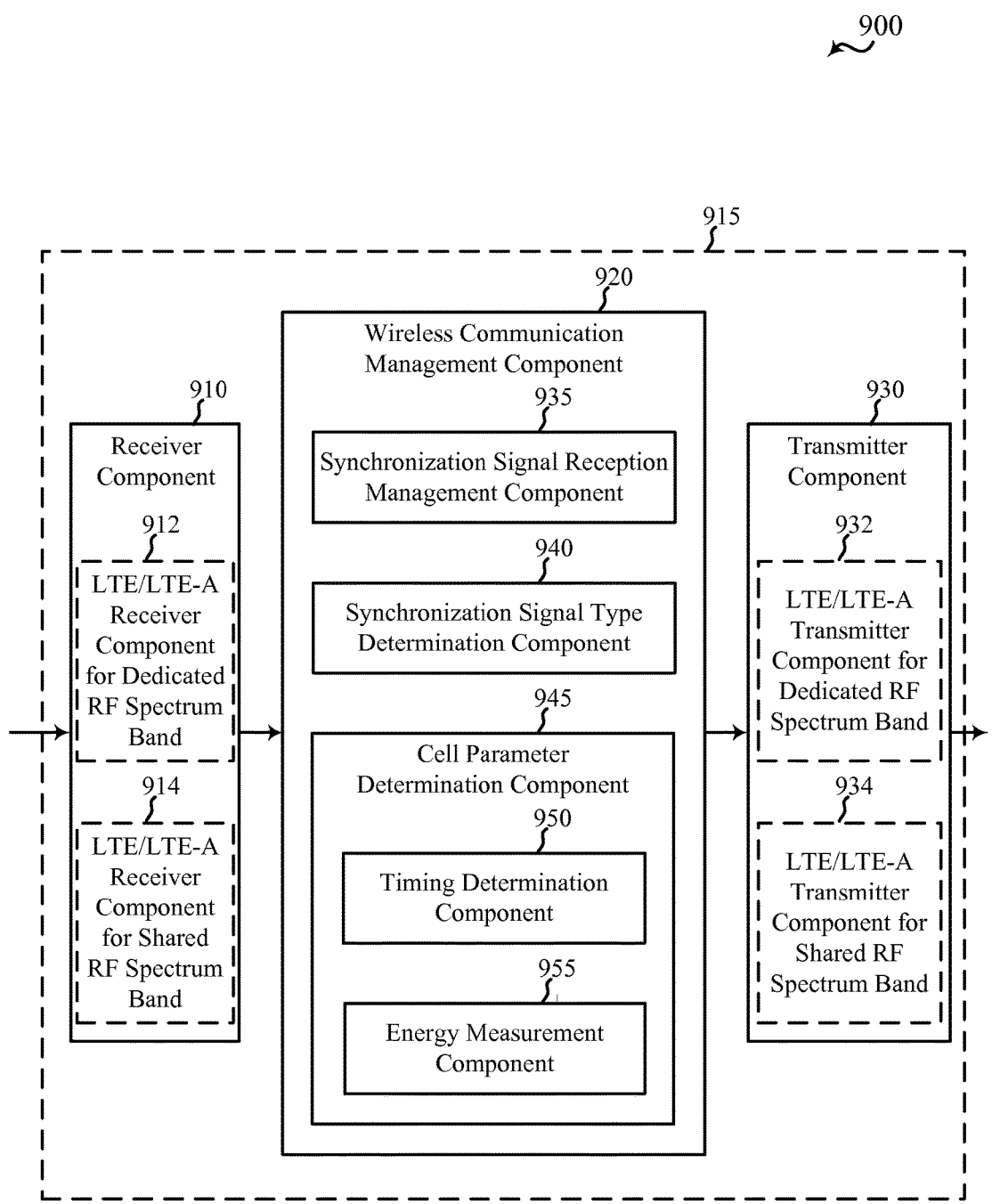
FIG. 9 shows a block diagram of an apparatus for use in wireless communication, in accordance with aspects of the present disclosure.

FIG. 9 shows a block diagram 900 of an apparatus 915 for use in wireless communication, in accordance with aspects of the present disclosure. The apparatus 915 may be an example of aspects of one or more of the UEs 115 described with reference to FIG. 1, first UE 215, second UE 216, third UE 217, or fourth UE 218 described with reference to FIG. 2, or apparatus 815 described with reference to FIG. 8. The apparatus 915 may also be or include a processor. The apparatus 915 may include a receiver component 910, a wireless communication management component 920, or a transmitter component 930. Each of these components may be in communication with each other.

The components of the apparatus 915 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver component 910 may include at least one RF receiver, such as at least one RF receiver operable to receive transmissions over a dedicated radio frequency spectrum band or a shared radio frequency spectrum band. The dedicated radio frequency spectrum band may include a radio frequency spectrum band for which one or more transmitting apparatuses may not be required to contend for access (e.g., a radio frequency spectrum band licensed to one or more users, such as a licensed radio frequency spectrum band usable for LTE/LTE-A communications). The shared radio frequency spectrum band may include a radio frequency spectrum band for which one or more transmitting apparatuses may need to contend for access (e.g., a radio frequency spectrum band that is available for unlicensed use, such as Wi-Fi use, or a radio frequency spectrum band that is available for use by one or more operators in an equally shared or prioritized manner). In some examples, the dedicated radio frequency spectrum band or the shared radio frequency spectrum band may be used for LTE/LTE-A communications, as described, for example, with reference to FIG. 1 or 2. The receiver component 910 may in some cases include separate receivers for the dedicated radio frequency spectrum band and the shared radio frequency spectrum band. The separate receivers may, in some examples, take the form of an LTE/LTE-A receiver component for communicating over the dedicated radio frequency spectrum band (e.g., LTE/LTE-A receiver component for dedicated RF spectrum band 912), and an LTE/LTE-A receiver component for communicating over the shared radio frequency spectrum band (e.g., LTE/LTE-A receiver component for shared RF spectrum band 914). The receiver component 910, including the LTE/LTE-A receiver component for dedicated RF spectrum band 912 or the LTE/LTE-A receiver component for shared RF spectrum band 914, may be used to receive various types of data or control signals (i.e., transmissions) over one or more communication links of a wireless communication system, such as one or more communication links of wireless communication system 100 described with reference to FIG. 1 or wireless communication system 200 described with reference to FIG. 2. The communication links may be established over the dedicated radio frequency spectrum band or the shared radio frequency spectrum band.

In some examples, the transmitter component 930 may include at least one RF transmitter, such as at least one RF transmitter operable to transmit over the dedicated radio frequency spectrum band or the shared radio frequency spectrum band. The transmitter component 930 may in some cases include separate transmitters for the dedicated radio frequency spectrum band and the shared radio frequency spectrum band. The separate transmitters may, in some examples, take the form of an LTE/LTE-A transmitter component for communicating over the dedicated radio frequency spectrum band (e.g., LTE/LTE-A transmitter component for dedicated RF spectrum band 932), and an LTE/LTE-A transmitter component for communicating over the shared radio frequency spectrum band (e.g., LTE/LTE-A transmitter component for shared RF spectrum band 934). The transmitter component 930, including the LTE/LTE-A transmitter component for dedicated RF spectrum band 932 or the LTE/LTE-A transmitter component for shared RF spectrum band 934, may be used to transmit various types of data or control signals (i.e., transmissions) over one or more communication links of a wireless communication system, such as one or more communication links of wireless communication system 100 described with reference to FIG. 1 or wireless communication system 200 described with reference to FIG. 2. The communication links may be established over the first radio frequency spectrum band or the second radio frequency spectrum band.

In some examples, the wireless communication management component 920 may be used to manage one or more aspects of wireless communication for the apparatus 915. In some examples, the wireless communication management component 920 may include a synchronization signal reception management component 935, a synchronization signal type determination component 940, or a cell parameter determination component 945.

In some examples, the synchronization signal reception management component 935 may be used to receive a synchronization signal associated with a type of transmission in the shared radio frequency spectrum band.

In some examples, the synchronization signal type determination component 940 may be used to determine a type of the synchronization signal. For example, the synchronization signal type determination component 940 may be used to determine whether the synchronization signal is a first type of synchronization signal or a second type of synchronization signal.

In some examples, the cell parameter determination component 945 may be used to determine one or more cell parameters based at least in part on the synchronization signal (e.g., based at least in part on the type of the synchronization signal). In some examples, the cell parameter determination component 945 may include a timing determination component 950 or an energy measurement component 955. Upon the synchronization signal type determination component 940 identifying the type of the synchronization signal as the first type of synchronization signal, the cell parameter determination component 945 or timing determination component 950 may determine at least a first cell parameter usable for initial acquisition of a cell (e.g., a timing of an LBT frame boundary, a timing of a radio frame boundary, a timing of a discovery signal transmission boundary, or a timing of a CET period boundary). Upon the synchronization signal type determination component 940 identifying the type of the synchronization signal as the second type of synchronization signal, the cell parameter determination component 945 or energy measurement component 955 may determine at least a second cell parameter usable for performing a cell measurement (e.g., a measurement of the energy of the synchronization signal).

In some examples, the first type of synchronization signal may include a first type of SSS (e.g., a Type 1 SSS), which first type of SSS may be transmitted in a first half (e.g., a first 5 milliseconds) of a radio frame (e.g., an LTE/LTE-A radio frame) transmitted in a dedicated radio frequency spectrum band. In some examples, the second type of synchronization signal may include a second type of SSS (e.g., a Type 2 LTE/LTE-A SSS), which second type of SSS may be transmitted in a second half (e.g., a second 5 milliseconds) of the radio frame transmitted in the dedicated radio frequency spectrum band. The dedicated radio frequency spectrum band may include a radio frequency spectrum band for which transmitting apparatuses may not be required to contend for access (e.g., a radio frequency spectrum band licensed to one or more users, such as a licensed radio frequency spectrum band usable for LTE/LTE-A communications).

In some examples, the second type of synchronization signal may include the first type of SSS. In at least some of these examples, the first type of synchronization signal may include the second type of SSS.

In some examples, the synchronization signal may be transmitted by a base station such as one of the base stations 105 described with reference to FIG. 1, first base station 205, or second base station 206 described with reference to FIG. 2, apparatus 505 described with reference to FIG. 5, apparatus 605 described with reference to FIG. 6, or apparatus 705 described with reference to FIG. 7.

Figure 10:
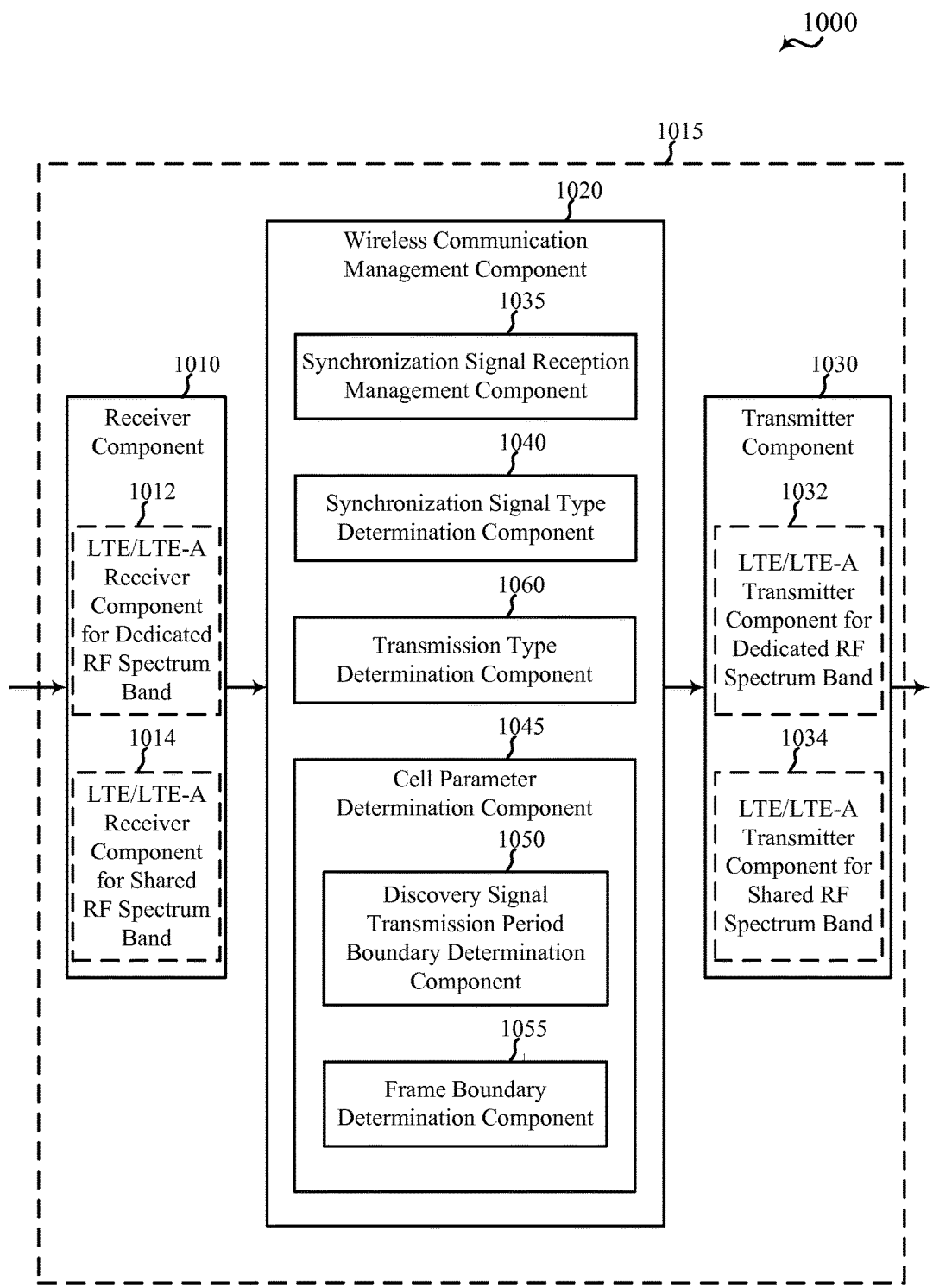
FIG. 10 shows a block diagram of an apparatus for use in wireless communication, in accordance with aspects of the present disclosure.

FIG. 10 shows a block diagram 1000 of an apparatus 1015 for use in wireless communication, in accordance with aspects of the present disclosure. The apparatus 1015 may be an example of aspects of one or more of the UEs 115 described with reference to FIG. 1, first UE 215, second UE 216, third UE 217, or fourth UE 218 described with reference to FIG. 2, apparatus 815 described with reference to FIG. 8, or apparatus 915 described with reference to FIG. 9. The apparatus 1015 may also be or include a processor. The apparatus 1015 may include a receiver component 1010, a wireless communication management component 1020, or a transmitter component 1030. Each of these components may be in communication with each other.

The components of the apparatus 1015 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver component 1010 may include at least one RF receiver, such as at least one RF receiver operable to receive transmissions over a dedicated radio frequency spectrum band or a shared radio frequency spectrum band. The dedicated radio frequency spectrum band may include a radio frequency spectrum band for which one or more transmitting apparatuses may not be required to contend for access (e.g., a radio frequency spectrum band licensed to one or more users, such as a licensed radio frequency spectrum band usable for LTE/LTE-A communications). The shared radio frequency spectrum band may include a radio frequency spectrum band for which one or more transmitting apparatuses may need to contend for access (e.g., a radio frequency spectrum band that is available for unlicensed use, such as Wi-Fi use, or a radio frequency spectrum band that is available for use by one or more operators in an equally shared or prioritized manner). In some examples, the dedicated radio frequency spectrum band or the shared radio frequency spectrum band may be used for LTE/LTE-A communications, as described, for example, with reference to FIG. 1 or 2. The receiver component 1010 may in some cases include separate receivers for the dedicated radio frequency spectrum band and the shared radio frequency spectrum band. The separate receivers may, in some examples, take the form of an LTE/LTE-A receiver component for communicating over the dedicated radio frequency spectrum band (e.g., LTE/LTE-A receiver component for dedicated RF spectrum band 1012), and an LTE/LTE-A receiver component for communicating over the shared radio frequency spectrum band (e.g., LTE/LTE-A receiver component for shared RF spectrum band 1014). The receiver component 1010, including the LTE/LTE-A receiver component for dedicated RF spectrum band 1012 or the LTE/LTE-A receiver component for shared RF spectrum band 1014, may be used to receive various types of data or control signals (i.e., transmissions) over one or more communication links of a wireless communication system, such as one or more communication links of wireless communication system 100 described with reference to FIG. 1 or wireless communication system 200 described with reference to FIG. 2. The communication links may be established over the dedicated radio frequency spectrum band or the shared radio frequency spectrum band.

In some examples, the transmitter component 1030 may include at least one RF transmitter, such as at least one RF transmitter operable to transmit over the dedicated radio frequency spectrum band or the shared radio frequency spectrum band. The transmitter component 1030 may in some cases include separate transmitters for the dedicated radio frequency spectrum band and the shared radio frequency spectrum band. The separate transmitters may, in some examples, take the form of an LTE/LTE-A transmitter component for communicating over the dedicated radio frequency spectrum band (e.g., LTE/LTE-A transmitter component for dedicated RF spectrum band 1032), and an LTE/LTE-A transmitter component for communicating over the shared radio frequency spectrum band (e.g., LTE/LTE-A transmitter component for shared RF spectrum band 1034). The transmitter component 1030, including the LTE/LTE-A transmitter component for dedicated RF spectrum band 1032 or the LTE/LTE-A transmitter component for shared RF spectrum band 1034, may be used to transmit various types of data or control signals (i.e., transmissions) over one or more communication links of a wireless communication system, such as one or more communication links of wireless communication system 100 described with reference to FIG. 1 or wireless communication system 200 described with reference to FIG. 2. The communication links may be established over the first radio frequency spectrum band or the second radio frequency spectrum band.

In some examples, the wireless communication management component 1020 may be used to manage one or more aspects of wireless communication for the apparatus 1015. In some examples, the wireless communication management component 1020 may include a synchronization signal reception management component 1035, a synchronization signal type determination component 1040, a transmission type determination component 1060, or a cell parameter determination component 1045.

In some examples, the synchronization signal reception management component 1035 may be used to receive a synchronization signal associated with a type of transmission in the shared radio frequency spectrum band.

In some examples, the synchronization signal type determination component 1040 may be used to determine a type of the synchronization signal. For example, the synchronization signal type determination component 1040 may be used to determine whether the synchronization signal is a first type of synchronization signal, a second type of synchronization signal, or a third type of synchronization signal.

In some examples, the transmission type determination component 1060 may be used to determine a type of transmission based at least in part on the type of the synchronization signal. Upon the synchronization signal type determination component 1040 identifying the type of the synchronization signal as the first type of synchronization signal, the transmission type determination component 1060 may identify the type of transmission as a discovery signal transmission, which may be a CET. Upon the synchronization signal type determination component 1040 identifying the type of the synchronization signal as the third type of synchronization signal, the transmission type determination component 1060 may identify the type of transmission as a subframe of an LBT frame or a radio frame, which in some examples may be a beginning subframe of an LBT frame or a radio frame.

In some examples, the cell parameter determination component 1045 may be used to determine one or more cell parameters based at least in part on the synchronization signal (e.g., based at least in part on the type of the synchronization signal). In some examples, the cell parameter determination component 1045 may include a discovery signal transmission period boundary determination component 1050 or a frame boundary determination component 1055. Upon the transmission type determination component 1060 identifying the transmission type as a discovery signal transmission, the cell parameter determination component 1045 or discovery signal transmission period boundary determination component 1050 may determine a timing of a discovery signal transmission period boundary. Upon the synchronization signal type determination component 1040 identifying the type of the synchronization signal as the second type of synchronization signal, the cell parameter determination component 1045 may determine a cell parameter usable for performing a cell measurement (e.g., a measurement of the energy of the synchronization signal). Upon the transmission type determination component 1060 identifying the transmission type as a subframe of an LBT frame or radio frame, the cell parameter determination component 1045 or frame boundary determination component 1055 may determine a timing of an LBT frame boundary or a timing of a radio frame boundary.

In some examples, the first type of synchronization signal may include a first type of SSS (e.g., a Type 1 SSS), which first type of SSS may be transmitted in a first half (e.g., a first 5 milliseconds) of a radio frame (e.g., an LTE/LTE-A radio frame) transmitted in a dedicated radio frequency spectrum band. In some examples, the second type of synchronization signal may include a second type of SSS (e.g., a Type 2 LTE/LTE-A SSS), which second type of SSS may be transmitted in a second half (e.g., a second 5 milliseconds) of the radio frame transmitted in the dedicated radio frequency spectrum band. The dedicated radio frequency spectrum band may include a radio frequency spectrum band for which transmitting apparatuses may not be required to contend for access (e.g., a radio frequency spectrum band licensed to one or more users, such as a licensed radio frequency spectrum band usable for LTE/LTE-A communications).

In some examples, the second type of synchronization signal may include the first type of SSS. In at least some of these examples, the first type of synchronization signal may include the second type of SSS.

In some examples, the synchronization signal may be transmitted by a base station such as one of the base stations 105 described with reference to FIG. 1, first base station 205 or second base station 206 described with reference to FIG. 2, apparatus 505 described with reference to FIG. 5, apparatus 605 described with reference to FIG. 6, or apparatus 705 described with reference to FIG. 7.

Figure 11:
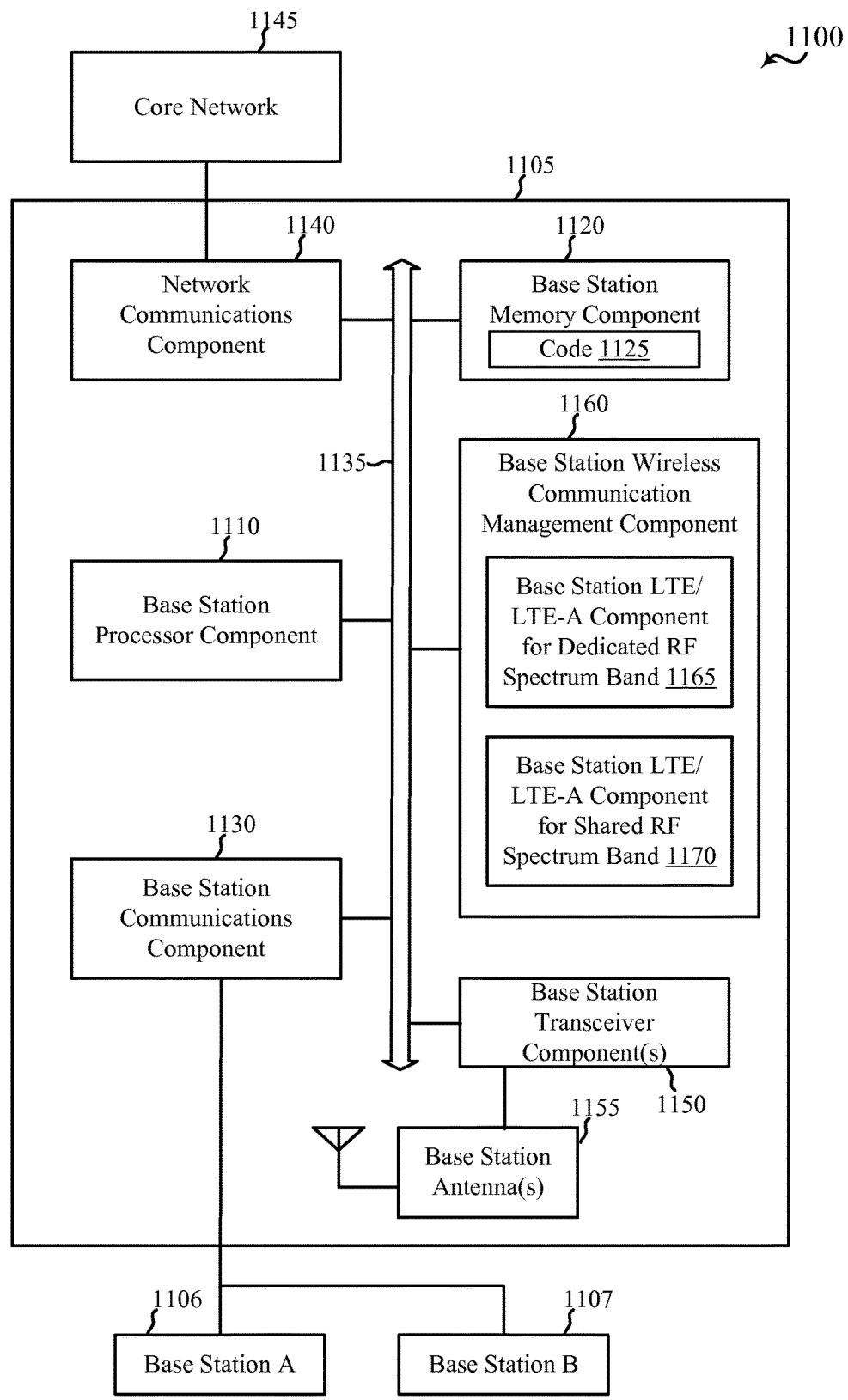
FIG. 11 shows a block diagram of a base station (e.g., a base station forming part or all of an eNB) for use in wireless communication, in accordance with aspects of the present disclosure.

FIG. 11 shows a block diagram 1100 of a base station 1105 (e.g., a base station forming part or all of an eNB) for use in wireless communication, in accordance with aspects of the present disclosure. In some examples, the base station 1105 may be an example of one or more aspects of the base stations 105 described with reference to FIG. 1, first base station 20, or second base station 206 described with reference to FIG. 2, apparatus 505 described with reference to FIG. 5, apparatus 605 described with reference to FIG. 6, or apparatus 705 described with reference to FIG. 7. The base station 1105 may be configured to implement or facilitate at least some of the base station features and functions described with reference to FIG. 1, 2, 3, 4, 5, 6, or 7.

The base station 1105 may include a base station processor component 1110, a base station memory component 1120, at least one base station transceiver component (represented by base station transceiver component(s) 1150), at least one base station antenna (represented by base station antenna(s) 1155), or a base station wireless communication management component 1160. The base station 1105 may also include one or more of a base station communications component 1130 or a network communications component 1140. Each of these components may be in communication with each other, directly or indirectly, over one or more buses 1135.

The base station memory component 1120 may include random access memory (RAM) or read-only memory (ROM). The base station memory component 1120 may store computer-readable, computer-executable code 1125 containing instructions that are configured to, when executed, cause the base station processor component 1110 to perform various functions described herein related to wireless communication, including the generation of synchronization signals usable by UEs for purposes such as an acquisition of a cell, or for cell measurement after acquisition of a cell (e.g., for purposes of cell search). Alternatively, the computer-executable code 1125 may not be directly executable by the base station processor component 1110 but be configured to cause the base station 1105 (e.g., when compiled and executed) to perform various of the functions described herein.

The base station processor component 1110 may include an intelligent hardware device, e.g., a central processing unit (CPU), a microcontroller, an ASIC, etc. The base station processor component 1110 may process information received through the base station transceiver component(s) 1150, the base station communications component 1130, or the network communications component 1140. The base station processor component 1110 may also process information to be sent to the transceiver component(s) 1150 for transmission through the antenna(s) 1155, to the base station communications component 1130, for transmission to one or more other base stations 1106 and 1107, or to the network communications component 1140 for transmission to a core network 1145, which may be an example of one or more aspects of the core network 130 described with reference to FIG. 1. The base station processor component 1110 may handle, alone or in connection with the base station wireless communication management component 1160, various aspects of communicating over (or managing communications over) a dedicated radio frequency spectrum band or a shared radio frequency spectrum band. The dedicated radio frequency spectrum band may include a radio frequency spectrum band for which one or more transmitting apparatuses may not be required to contend for access (e.g., a radio frequency spectrum band licensed to one or more users, such as a licensed radio frequency spectrum band usable for LTE/LTE-A communications). The shared radio frequency spectrum band may include a radio frequency spectrum band for which one or more transmitting apparatuses may need to contend for access (e.g., a radio frequency spectrum band that is available for unlicensed use, such as Wi-Fi use, or a radio frequency spectrum band that is available for use by one or more operators in an equally shared or prioritized manner).

The base station transceiver component(s) 1150 may include a modem configured to modulate packets and provide the modulated packets to the base station antenna(s) 1155 for transmission, and to demodulate packets received from the base station antenna(s) 1155. The base station transceiver component(s) 1150 may, in some examples, be implemented as one or more base station transmitter components and one or more separate base station receiver components. The base station transceiver component(s) 1150 may support communications in the dedicated radio frequency spectrum band or the shared radio frequency spectrum band. The base station transceiver component(s) 1150 may be configured to communicate bi-directionally, via the antenna(s) 1155, with one or more UEs or apparatuses, such as one or more of the UEs 115 described with reference to FIG. 1, first UE 215, second UE 216, third UE 217, or fourth UE 218 described with reference to FIG. 2, apparatus 815 described with reference to FIG. 8, apparatus 915 described with respect to FIG. 9, or apparatus 1015 described with reference to FIG. 10. The base station 1105 may, for example, include one or more base station antennas 1155 (e.g., an antenna array). The base station 1105 may communicate with the core network 1145 through the network communications component 1140. The base station 1105 may also communicate with other base stations, such as the other base stations 1106 and the other base station 1107, using the base station communications component 1130.

The base station wireless communication management component 1160 may be configured to perform or control some or all of the features or functions described with reference to FIG. 1, 2, 3, 4, 5, 6, or 7 related to wireless communication over the dedicated radio frequency spectrum band or the shared radio frequency spectrum band. For example, the base station wireless communication management component 1160 may be configured to support a supplemental downlink mode (e.g., a licensed assisted access mode), a carrier aggregation mode, or a standalone mode using the dedicated radio frequency spectrum band or the shared radio frequency spectrum band. The base station wireless communication management component 1160 may include a base station LTE/LTE-A component for dedicated RF spectrum band 1165 configured to handle LTE/LTE-A communications in the dedicated radio frequency spectrum band, and a base station LTE/LTE-A component for shared RF spectrum band 1170 configured to handle LTE/LTE-A communications in the shared radio frequency spectrum band. The base station wireless communication management component 1160, or portions of it, may include a processor, or some or all of the functions of the base station wireless communication management component 1160 may be performed by the base station processor component 1110 or in connection with the base station processor component 1110. In some examples, the base station wireless communication management component 1160 may be an example of the wireless communication management component 520 described with reference to FIG. 5, wireless communication management component 620 described with reference to FIG. 6, or wireless communication management component 720 described with reference to FIG. 7.

Figure 12:
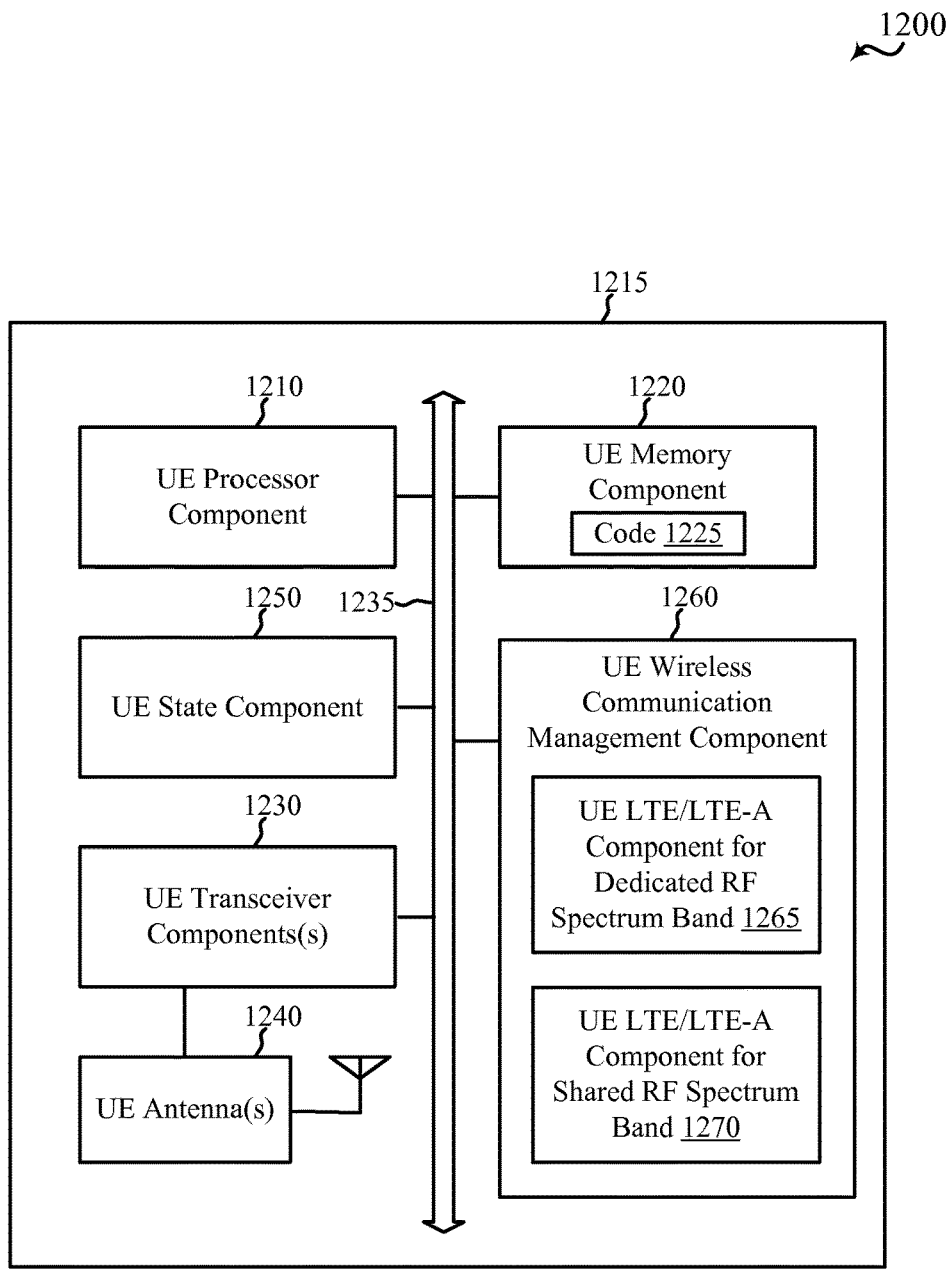
FIG. 12 shows a block diagram of a UE for use in wireless communication, in accordance with aspects of the present disclosure.

FIG. 12 shows a block diagram 1200 of a UE 1215 for use in wireless communication, in accordance with aspects of the present disclosure. The UE 1215 may have configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 1215 may, in some examples, have an internal power supply (not shown), such as a small battery, to facilitate mobile operation. In some examples, the UE 1215 may be an example of aspects of one or more of the UEs 115 described with respect to FIG. 1, first UE 215, second UE 216, third UE 217, or fourth UE 218 described with reference to FIG. 2, apparatus 815 described with reference to FIG. 8, apparatus 915 described with reference to FIG. 9, or apparatus 1015 described with reference to FIG. 10. The UE 1215 may be configured to implement at least some of the UE or apparatus features and functions described with reference to FIG. 1, 2, 3, 4, 8, 9, or 10.

The UE 1215 may include a UE processor component 1210, a UE memory component 1220, at least one UE transceiver component (represented by UE transceiver component(s) 1230), at least one UE antenna (represented by UE antenna(s) 1240), or a UE wireless communication management component 1260. Each of these components may be in communication with each other, directly or indirectly, over one or more buses 1235.

The UE memory component 1220 may include RAM or ROM. The UE memory component 1220 may store computer-readable, computer-executable code 1225 containing instructions that are configured to, when executed, cause the UE processor component 1210 to perform various functions described herein related to wireless communication, including monitoring for synchronization signals usable by the UE for purposes such as an acquisition of a cell, or for cell measurement after acquisition of a cell (e.g., for purposes of cell search). Alternatively, the computer-executable code 1225 may not be directly executable by the UE processor component 1210 but be configured to cause the UE 1215 (e.g., when compiled and executed) to perform various of the functions described herein.

The UE processor component 1210 may include an intelligent hardware device, e.g., a CPU, a microcontroller, an ASIC, etc. The UE processor component 1210 may process information received through the UE transceiver component(s) 1230 or information to be sent to the UE transceiver component(s) 1230 for transmission through the UE antenna(s) 1240. The UE processor component 1210 may handle, alone or in connection with the UE wireless communication management component 1260, various aspects of communicating over (or managing communications over) a dedicated radio frequency spectrum band or a shared radio frequency spectrum band. The dedicated radio frequency spectrum band may include a radio frequency spectrum band for which one or more transmitting apparatuses may not be required to contend for access (e.g., a radio frequency spectrum band licensed to one or more users, such as a licensed radio frequency spectrum band usable for LTE/LTE-A communications). The shared radio frequency spectrum band may include a radio frequency spectrum band for which one or more transmitting apparatuses may need to contend for access (e.g., a radio frequency spectrum band that is available for unlicensed use, such as Wi-Fi use, or a radio frequency spectrum band that is available for use by one or more operators in an equally shared or prioritized manner).

The UE transceiver component(s) 1230 may include a modem configured to modulate packets and provide the modulated packets to the UE antenna(s) 1240 for transmission, and to demodulate packets received from the UE antenna(s) 1240. The UE transceiver component(s) 1230 may, in some examples, be implemented as one or more UE transmitter components and one or more separate UE receiver components. The UE transceiver component(s) 1230 may support communications in the licensed radio frequency spectrum band or the unlicensed radio frequency spectrum band. The UE transceiver component(s) 1230 may be configured to communicate bi-directionally, via the UE antenna(s) 1240, with one or more of the base stations 105 described with reference to FIG. 1, first base station 205 or second base station 206 described with reference to FIG. 2, base station 1105 described with reference to FIG. 11, apparatus 505 described with reference to FIG. 5, apparatus 605 described with reference to FIG. 6, or apparatus 705 described with reference to FIG. 7. While the UE 1215 may include a single UE antenna, there may be examples in which the UE 1215 may include multiple UE antennas 1240.

The UE 1215 may also include a UE state component 1250. The UE state component 1250 may be used, for example, to manage transitions of the UE 1215 between an RRC idle state and an RRC connected state, and may be in communication with other components of the UE 1215, directly or indirectly, over the one or more buses 1235. The UE state component 1250, or portions of it, may include a processor, or some or all of the functions of the UE state component 1250 may be performed by the UE processor component 1210 or in connection with the UE processor component 1210.

The UE wireless communication management component 1260 may be configured to perform or control some or all of the UE or apparatus features or functions described with reference to FIG. 1, 2, 3, 4, 8, 9, or 10 related to wireless communication over the dedicated radio frequency spectrum band or the shared radio frequency spectrum band. For example, the UE wireless communication management component 1260 may be configured to support a supplemental downlink mode (e.g., a licensed assisted access mode), a carrier aggregation mode, or a standalone mode using the dedicated radio frequency spectrum band or the shared radio frequency spectrum band. The UE wireless communication management component 1260 may include a UE LTE/LTE-A component for dedicated RF spectrum band 1265 configured to handle LTE/LTE-A communications in the dedicated radio frequency spectrum band, and a UE LTE/LTE-A component for shared RF spectrum band 1270 configured to handle LTE/LTE-A communications in the shared radio frequency spectrum band. The UE wireless communication management component 1260, or portions of it, may include a processor, or some or all of the functions of the UE wireless communication management component 1260 may be performed by the UE processor component 1210 or in connection with the UE processor component 1210. In some examples, the UE wireless communication management component 1260 may be an example of wireless communication management component 820 described with reference to FIG. 8, wireless communication management component 920 described with reference to FIG. 9, or wireless communication management component 1020 described with reference to FIG. 10.

Figure 13:
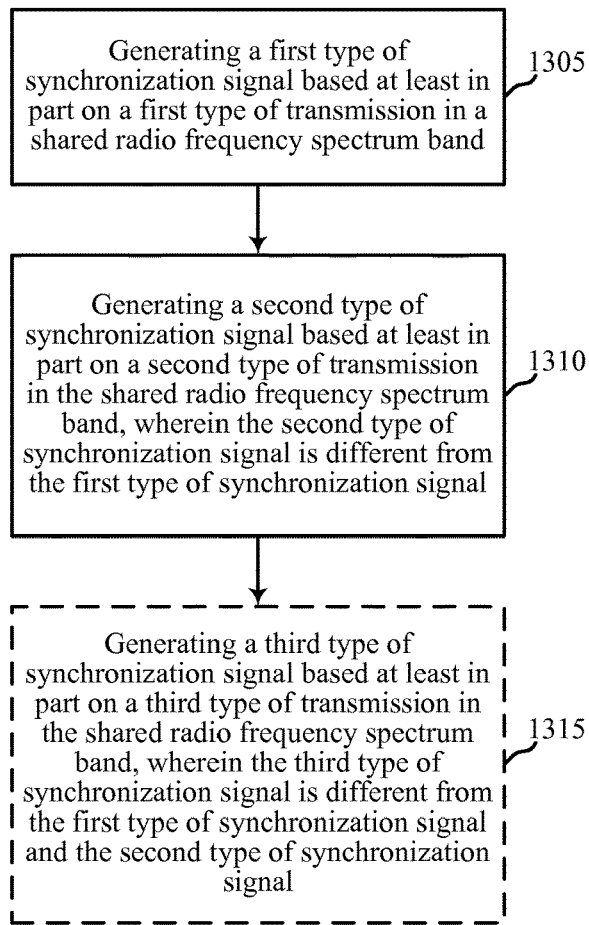
FIG. 13 is a flow chart illustrating an exemplary method for wireless communication, in accordance with aspects of the present disclosure.

FIG. 13 is a flow chart illustrating an exemplary method 1300 for wireless communication, in accordance with aspects of the present disclosure. For clarity, the exemplary method 1300 is described below with reference to aspects of one or more of the base stations 105 described with reference to FIG., first base station 205 or second base station 206 described with reference to FIG. 2, base station 1105 described with reference to FIG. 11, apparatus 505 described with reference to FIG. 5, apparatus 605 described with reference to FIG. 6, or apparatus 705 described with reference to FIG. 7. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 1305, the exemplary method 1300 may include generating a first type of synchronization signal based at least in part on a first type of transmission in a shared radio frequency spectrum band. The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by one or more operators in an equally shared or prioritized manner). The operation(s) at block 1305 may be performed using wireless communication management component 520 described with reference to FIG. 5, wireless communication management component 620 described with reference to FIG. 6, wireless communication management component 720 described with reference to FIG. 7, base station wireless communication management component 1160 described with reference to FIG. 11, first type of synchronization signal generation component 535 described with reference to FIG. 5, first type of synchronization signal generation component 635 described with reference to FIG. 6, or first type of synchronization signal generation component 735 described with reference to FIG. 7.

At block 1310, the exemplary method 1300 may include generating a second type of synchronization signal based at least in part on a second type of transmission in the shared radio frequency spectrum band. The second type of synchronization signal may be different from the first type of synchronization signal. The operation(s) at block 1310 may be performed using wireless communication management component 520 described with reference to FIG. 5, wireless communication management component 620 described with reference to FIG. 6, wireless communication management component 720 described with reference to FIG. 7, base station wireless communication management component 1160 described with reference to FIG. 11, second type of synchronization signal generation component 540 described with reference to FIG. 5, second type of synchronization signal generation component 640 described with reference to FIG. 6, or second type of synchronization signal generation component 740 described with reference to FIG. 7.

At block 1315, the exemplary method 1300 may optionally include generating a third type of synchronization signal based at least in part on a third type of transmission in the shared radio frequency spectrum band. The third type of synchronization signal may be different from the first type of synchronization signal and the second type of synchronization signal. The operation(s) at block 1315 may be performed using wireless communication management component 520 described with reference to FIG. 5, wireless communication management component 620 described with reference to FIG. 6, wireless communication management component 720 described with reference to FIG. 7, base station wireless communication management component 1160 described with reference to FIG. 11, or third type of synchronization signal generation component 770 described with reference to FIG. 7.

In some examples, the first type of synchronization signal may include a first type of secondary synchronization signal (e.g., a Type 1 secondary synchronization signal (SSS)), which first type of SSS may be transmitted in a first half (e.g., a first 5 milliseconds) of a radio frame (e.g., an LTE/LTE-A radio frame) transmitted in the dedicated radio frequency spectrum band. In at least some of these examples, the second type of synchronization signal may include a second type of SSS (e.g., a Type 2 LTE/LTE-A SSS), which second type of SSS may be transmitted in a second half (e.g., a second 5 milliseconds) of the radio frame transmitted in the dedicated radio frequency spectrum band. The dedicated radio frequency spectrum band may include a radio frequency spectrum band for which transmitting apparatuses may not be required to contend for access (e.g., a radio frequency spectrum band licensed to one or more users, such as a licensed radio frequency spectrum band usable for LTE/LTE-A communications).

In some examples, the second type of synchronization signal may include the first type of SSS. In at least some of these examples, the first type of synchronization signal may include the second type of SSS.

Thus, the exemplary method 1300 may provide for wireless communication. It should be noted that the exemplary method 1300 is just one implementation and that the operations of the exemplary method 1300 may be rearranged or otherwise modified such that other implementations are possible.

Figure 14:
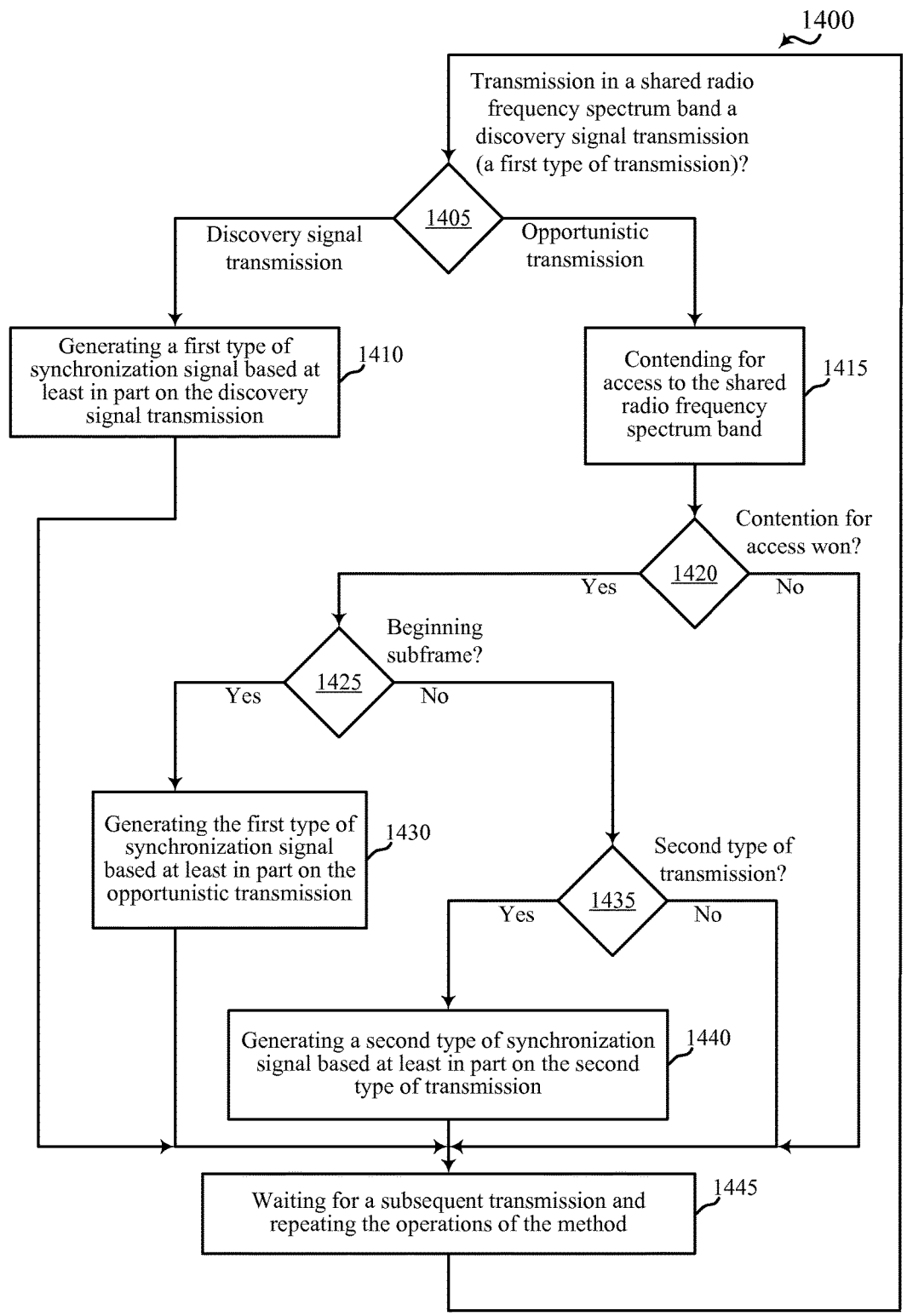
FIG. 14 is a flow chart illustrating an exemplary method for wireless communication, in accordance with aspects of the present disclosure.

FIG. 14 is a flow chart illustrating an exemplary method 1400 for wireless communication, in accordance with aspects of the present disclosure. For clarity, the exemplary method 1400 is described below with reference to aspects of one or more of the base stations 105 described with reference to FIG. 1, first base station 205 or second base station 206 described with reference to FIG. 2, base station 1105 described with reference to FIG. 11, apparatus 505 described with reference to FIG. 5, apparatus 605 described with reference to FIG. 6, or apparatus 705 described with reference to FIG. 7. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

In some examples, the output of the exemplary method 1400 may include one or more of a first type of synchronization signal or a second type of synchronization signal. The second type of synchronization signal may be different from the first type of synchronization signal.

At block 1405, the exemplary method 1400 may include determining whether a transmission (e.g., part or all of a downlink subframe) in a shared radio frequency spectrum band is a discovery signal transmission (e.g., a first type of transmission) in the shared radio frequency spectrum band, which in some examples may be a CET. When the transmission is determined to be a discovery signal transmission, the exemplary method 1400 may continue at block 1410. When the transmission is determined to be an opportunistic transmission, the exemplary method 1400 may continue at block 1415. The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by one or more operators in an equally shared or prioritized manner). The operation(s) at block 1405 may be performed using wireless communication management component 520 described with reference to FIG. 5, wireless communication management component 620 described with reference to FIG. 6, wireless communication management component 720 described with reference to FIG. 7, base station wireless communication management component 1160 described with reference to FIG. 11, transmission determination component 645 described with reference to FIG. 6, transmission determination component 745 described with reference to FIG. 7, first type of transmission determination component 650 described with reference to FIG. 6, or first type of transmission determination component 750 described with reference to FIG. 7.

At block 1410, the exemplary method 1400 may include generating the first type of synchronization signal based at least in part on the discovery signal transmission. The operation(s) at block 1410 may be performed using the wireless communication management component 520 described with reference to FIG. 5, wireless communication management component 620 described with reference to FIG. 6, wireless communication management component 720 described with reference to FIG. 7, or base station wireless communication management component 1160 described with reference to FIG. 11, first type of synchronization signal generation component 535 described with reference to FIG. 5, first type of synchronization signal generation component 635 described with reference to FIG. 6, or first type of synchronization signal generation component 735 described with reference to FIG. 7.

At block 1415, the exemplary method 1400 may include contending for access to the shared radio frequency spectrum band. Upon winning contention for access to the shared radio frequency spectrum band, and at block 1420, the flow of the exemplary method 1400 may be routed to block 1425. Upon losing contention for access to the shared radio frequency spectrum band, and at block 1420, the flow of the exemplary method 1400 may be routed to block 1445. The operation(s) at block 1415 or 1420 may be performed using wireless communication management component 520 described with reference to FIG. 5, wireless communication management component 620 described with reference to FIG. 6, wireless communication management component 720 described with reference to FIG. 7, base station wireless communication management component 1160 described with reference to FIG. 11, CCA component 665 described with reference to FIG. 6, or CCA component 765 described with reference to FIG. 7.

At block 1425, the exemplary method 1400 may include determining whether the opportunistic transmission in the shared radio frequency spectrum band is a subframe of an LBT frame or radio frame, which in some examples may be a beginning subframe of an LBT frame or a radio frame (e.g., a third type of transmission or a periodic opportunistic transmission). When the opportunistic transmission is determined to be a beginning subframe of an LBT frame or radio frame, the exemplary method 1400 may continue at block 1430. When the opportunistic transmission is determined to not a beginning subframe of an LBT frame or radio frame, the exemplary method 1400 may continue at block 1435. The operation(s) at block 1425 may be performed using wireless communication management component 520 described with reference to FIG. 5, wireless communication management component 620 described with reference to FIG. 6, wireless communication management component 720 described with reference to FIG. 7, base station wireless communication management component 1160 described with reference to FIG. 11, transmission determination component 645 described with reference to FIG. 6, transmission determination component 745 described with reference to FIG. 7, third type of transmission determination component 660 described with reference to FIG. 6, or third type of transmission determination component 760 described with reference to FIG. 7.

At block 1430, the exemplary method 1400 may include generating the first type of synchronization signal based at least in part on the opportunistic transmission (or based at least in part on the beginning subframe of the LBT frame or radio frame). The operation(s) at block 1430 may be performed using wireless communication management component 520 described with reference to FIG. 5, wireless communication management component 620 described with reference to FIG. 6, wireless communication management component 720 described with reference to FIG. 7, base station wireless communication management component 1160 described with reference to FIG. 11, first type of synchronization signal generation component 535 described with reference to FIG. 5, first type of synchronization signal generation component 635 described with reference to FIG. 6, or first type of synchronization signal generation component 735 described with reference to FIG. 7.

At block 1435, the exemplary method 1400 may include determining whether the opportunistic transmission in the shared radio frequency spectrum band is a second type of transmission (e.g., a subframe identified for asynchronous transmission of a synchronization signal) in the shared radio frequency spectrum band. When the opportunistic transmission is determined to be the second type of transmission, the exemplary method 1400 may continue at block 1440. When the opportunistic transmission is determined to not be the second type of transmission, the exemplary method 1400 may continue at block 1445. The operation(s) at block 1435 may be performed using wireless communication management component 520 described with reference to FIG. 5, wireless communication management component 620 described with reference to FIG. 6, wireless communication management component 720 described with reference to FIG. 7, base station wireless communication management component 1160 described with reference to FIG. 11, transmission determination component 645 described with reference to FIG. 6, transmission determination component 745 described with reference to FIG. 7, second type of transmission determination component 655 described with reference to FIG. 6, or second type of transmission determination component 755 described with reference to FIG. 7.

At block 1440, the exemplary method 1400 may include generating the second type of synchronization signal based at least in part on the second type of transmission. The operation(s) at block 1440 may be performed using wireless communication management component 520 described with reference to FIG. 5, wireless communication management component 620 described with reference to FIG. 6, wireless communication management component 720 described with reference to FIG. 7, base station wireless communication management component 1160 described with reference to FIG. 11, second type of synchronization signal generation component 540 described with reference to FIG. 5, second type of synchronization signal generation component 640 described with reference to FIG. 6, or second type of synchronization signal generation component 740 described with reference to FIG. 7.

At block 1445, and after performing the operation(s) at block 1410, 1430, or 1430, or as directed at block 1420 or 1435, the exemplary method 1400 may include waiting for a subsequent transmission (e.g., part or all of a next downlink subframe), and repeating the operations of the exemplary method 1400 for the subsequent transmission (e.g., by routing the flow of the exemplary method 1400 back to block 1405). The operation(s) at block 1445 may be performed using wireless communication management component 520 described with reference to FIG. 5, wireless communication management component 620 described with reference to FIG. 6, wireless communication management component 720 described with reference to FIG. 7, base station wireless communication management component 1160 described with reference to FIG. 11, transmission determination component 645 described with reference to FIG. 6, or transmission determination component 745 described with reference to FIG. 7.

In some examples, the first type of synchronization signal may include a first type of secondary synchronization signal (e.g., a Type 1 secondary synchronization signal (SSS)), which first type of SSS may be transmitted in a first half (e.g., a first 5 milliseconds) of a radio frame (e.g., an LTE/LTE-A radio frame) transmitted in the dedicated radio frequency spectrum band. In at least some of these examples, the second type of synchronization signal may include a second type of SSS (e.g., a Type 2 LTE/LTE-A SSS), which second type of SSS may be transmitted in a second half (e.g., a second 5 milliseconds) of the radio frame transmitted in the dedicated radio frequency spectrum band. The dedicated radio frequency spectrum band may include a radio frequency spectrum band for which transmitting apparatuses may not be required to contend for access (e.g., a radio frequency spectrum band licensed to one or more users, such as a licensed radio frequency spectrum band usable for LTE/LTE-A communications).

In some examples, the second type of synchronization signal may include the first type of SSS. In at least some of these examples, the first type of synchronization signal may include the second type of SSS.

Thus, the exemplary method 1400 may provide for wireless communication. It should be noted that the exemplary method 1400 is just one implementation and that the operations of the exemplary method 1400 may be rearranged or otherwise modified such that other implementations are possible.

Figure 15:
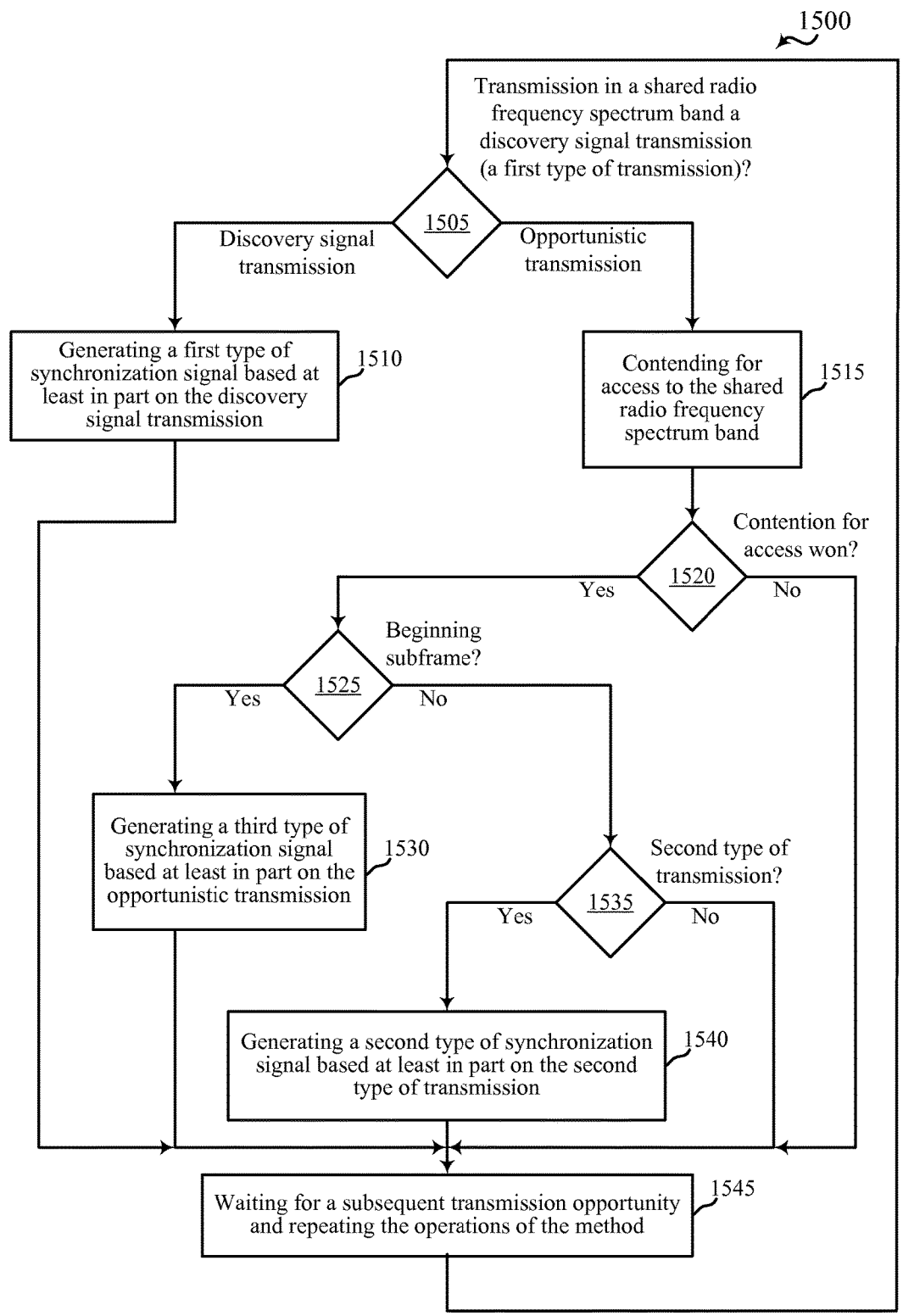
FIG. 15 is a flow chart illustrating an exemplary method for wireless communication, in accordance with aspects of the present disclosure.

FIG. 15 is a flow chart illustrating an exemplary method 1500 for wireless communication, in accordance with aspects of the present disclosure. For clarity, the exemplary method 1500 is described below with reference to aspects of one or more of the base stations 105 described with reference to FIG. 1, first base station 205 or second base station 206 described with reference to FIG. 2, base station 1105 described with reference to FIG. 11, apparatus 505 described with reference to FIG. 5, apparatus 605 described with reference to FIG. 6, or apparatus 705 described with reference to FIG. 7. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

In some examples, the output of the exemplary method 1500 may include one or more of a first type of synchronization signal, a second type of synchronization signal, or a third type of synchronization signal. The second type of synchronization signal may be different from the first type of synchronization signal, and the third type of synchronization signal may be different from each of the first type of synchronization signal and the second type of synchronization signal.

At block 1505, the exemplary method 1500 may include determining whether a transmission (e.g., part or all of a downlink subframe) in a shared radio frequency spectrum band is a discovery signal transmission (e.g., a first type of transmission) in the shared radio frequency spectrum band, which in some examples may be a CET. When the transmission is determined to be a discovery signal transmission, the exemplary method 1500 may continue at block 1510. When the transmission is determined to be an opportunistic transmission, the exemplary method 1500 may continue at block 1515. The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by one or more operators in an equally shared or prioritized manner). The operation(s) at block 1505 may be performed using wireless communication management component 520 described with reference to FIG. 5, wireless communication management component 620 described with reference to FIG. 6, wireless communication management component 720 described with reference to FIG. 7, base station wireless communication management component 1160 described with reference to FIG. 11, transmission determination component 645 described with reference to FIG. 6, transmission determination component 745 described with reference to FIG. 7, first type of transmission determination component 650 described with reference to FIG. 6, or first type of transmission determination component 750 described with reference to FIG. 7.

At block 1510, the exemplary method 1500 may include generating the first type of synchronization signal based at least in part on the discovery signal transmission. The operation(s) at block 1510 may be performed using the wireless communication management component 520 described with reference to FIG. 5, wireless communication management component 620 described with reference to FIG. 6, wireless communication management component 720 described with reference to FIG. 7, or base station wireless communication management component 1160 described with reference to FIG. 11, first type of synchronization signal generation component 535 described with reference to FIG. 5, first type of synchronization signal generation component 635 described with reference to FIG. 6, or first type of synchronization signal generation component 735 described with reference to FIG. 7.

At block 1515, the exemplary method 1500 may include contending for access to the shared radio frequency spectrum band. Upon winning contention for access to the shared radio frequency spectrum band, and at block 1520, the flow of the exemplary method 1500 may be routed to block 1525. Upon losing contention for access to the shared radio frequency spectrum band, and at block 1520, the flow of the exemplary method 1500 may be routed to block 1545. The operation(s) at block 1515 or 1520 may be performed using wireless communication management component 520 described with reference to FIG. 5, wireless communication management component 620 described with reference to FIG. 6, wireless communication management component 720 described with reference to FIG. 7, base station wireless communication management component 1160 described with reference to FIG. 11, CCA component 665 described with reference to FIG. 6, or CCA component 765 described with reference to FIG. 7.

At block 1525, the exemplary method 1500 may include determining whether the opportunistic transmission in the shared radio frequency spectrum band is a subframe of an LBT frame or radio frame, which in some examples may be a beginning subframe of an LBT frame or a radio frame (e.g., a third type of transmission or a periodic opportunistic transmission). When the opportunistic transmission is determined to be a beginning subframe of an LBT frame or radio frame, the exemplary method 1500 may continue at block 1530. When the opportunistic transmission is determined to not be a beginning subframe of an LBT frame or radio frame, the exemplary method 1500 may continue at block 1535. The operation(s) at block 1525 may be performed using wireless communication management component 520 described with reference to FIG. 5, wireless communication management component 620 described with reference to FIG. 6, wireless communication management component 720 described with reference to FIG. 7, base station wireless communication management component 1160 described with reference to FIG. 11, transmission determination component 645 described with reference to FIG. 6, transmission determination component 745 described with reference to FIG. 7, third type of transmission determination component 660 described with reference to FIG. 6, or third type of transmission determination component 760 described with reference to FIG. 7.

At block 1530, the exemplary method 1500 may include generating the third type of synchronization signal based at least in part on the opportunistic transmission (or based at least in part on the beginning subframe of the LBT frame or radio frame). The operation(s) at block 1530 may be performed using wireless communication management component 520 described with reference to FIG. 5, wireless communication management component 620 described with reference to FIG. 6, wireless communication management component 720 described with reference to FIG. 7, base station wireless communication management component 1160 described with reference to FIG. 11, or third type of synchronization signal generation component 770 described with reference to FIG. 7.

At block 1535, the exemplary method 1500 may include determining whether the opportunistic transmission in the shared radio frequency spectrum band is a second type of transmission (e.g., a subframe identified for asynchronous transmission of a synchronization signal) in the shared radio frequency spectrum band. When the opportunistic transmission is determined to be the second type of transmission, the exemplary method 1500 may continue at block 1540. When the opportunistic transmission is determined to not be the second type of transmission, the exemplary method 1500 may continue at block 1545. The operation(s) at block 1535 may be performed using wireless communication management component 520 described with reference to FIG. 5, wireless communication management component 620 described with reference to FIG. 6, wireless communication management component 720 described with reference to FIG. 7, base station wireless communication management component 1160 described with reference to FIG. 11, transmission determination component 645 described with reference to FIG. 6, transmission determination component 745 described with reference to FIG. 7, second type of transmission determination component 655 described with reference to FIG. 6, or second type of transmission determination component 755 described with reference to FIG. 7

At block 1540, the exemplary method 1500 may include generating the second type of synchronization signal based at least in part on the second type of transmission. The operation(s) at block 1540 may be performed using wireless communication management component 520 described with reference to FIG. 5, wireless communication management component 620 described with reference to FIG. 6, wireless communication management component 720 described with reference to FIG. 7, base station wireless communication management component 1160 described with reference to FIG. 11, second type of synchronization signal generation component 540 described with reference to FIG. 5, second type of synchronization signal generation component 640 described with reference to FIG. 6, or second type of synchronization signal generation component 740 described with reference to FIG. 7.

At block 1545, and after performing the operation(s) at block 1510, 1530, or 1530, or as directed at block 1520 or 1535, the exemplary method 1500 may include waiting for a subsequent transmission (e.g., part or all of a next downlink subframe), and repeating the operations of the exemplary method 1500 for the subsequent transmission (e.g., by routing the flow of the exemplary method 1500 back to block 1505). The operation(s) at block 1545 may be performed using wireless communication management component 520 described with reference to FIG. 5, wireless communication management component 620 described with reference to FIG. 6, wireless communication management component 720 described with reference to FIG. 7, base station wireless communication management component 1160 described with reference to FIG. 11, transmission determination component 645 described with reference to FIG. 6, or transmission determination component 745 described with reference to FIG.

In some examples, the first type of synchronization signal may include a first type of secondary synchronization signal (e.g., a Type 1 secondary synchronization signal (SSS)), which first type of SSS may be transmitted in a first half (e.g., a first 5 milliseconds) of a radio frame (e.g., an LTE/LTE-A radio frame) transmitted in the dedicated radio frequency spectrum band. In at least some of these examples, the second type of synchronization signal may include a second type of SSS (e.g., a Type 2 LTE/LTE-A SSS), which second type of SSS may be transmitted in a second half (e.g., a second 5 milliseconds) of the radio frame transmitted in the dedicated radio frequency spectrum band. The dedicated radio frequency spectrum band may include a radio frequency spectrum band for which transmitting apparatuses may not be required to contend for access (e.g., a radio frequency spectrum band licensed to one or more users, such as a licensed radio frequency spectrum band usable for LTE/LTE-A communications).

In some examples, the second type of synchronization signal may include the first type of SSS. In at least some of these examples, the first type of synchronization signal may include the second type of SSS.

In some examples, the second type of synchronization signal may include the first type of secondary synchronization signal. In at least some of these examples, the first type of synchronization signal may include the second type of secondary synchronization signal.

Thus, the exemplary method 1500 may provide for wireless communication. It should be noted that the exemplary method 1500 is just one implementation and that the operations of the exemplary method 1500 may be rearranged or otherwise modified such that other implementations are possible.

In some examples, aspects of two or more of the exemplary method 1300 described with reference to FIG. 13, the exemplary method 1400 described with reference to FIG. 14, or the exemplary method 1500 described with reference to FIG. 15 may be combined.

Figure 16:
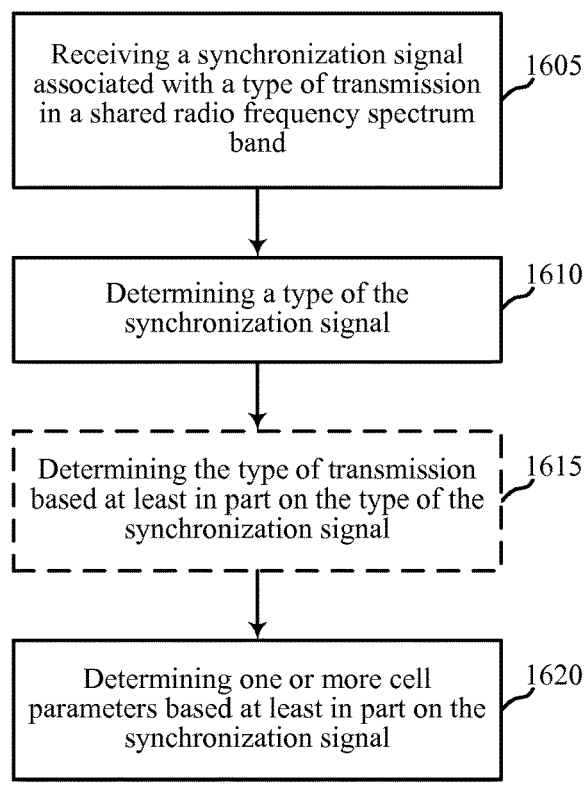
FIG. 16 is a flow chart illustrating an exemplary method for wireless communication, in accordance with aspects of the present disclosure.

FIG. 16 is a flow chart illustrating an exemplary method 1600 for wireless communication, in accordance with aspects of the present disclosure. For clarity, the exemplary method 1600 is described below with reference to aspects of one or more of the UEs 115 described with reference to FIG. 1, first UE 215, second UE 216, third UE 217, or fourth UE 218 described with reference to FIG. 2, UE 1215 described with reference to FIG. 12, apparatus 815 described with reference to FIG. 8, apparatus 915 described with reference to FIG. 9, or apparatus 1015 described with reference to FIG. 10. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1605, the exemplary method 1600 may include receiving a synchronization signal associated with a type of transmission in a shared radio frequency spectrum band. The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by one or more operators in an equally shared or prioritized manner). The operation(s) at block 1605 may be performed using wireless communication management component 820 described with reference to FIG. 8, wireless communication management component 920 described with reference to FIG. 9, wireless communication management component 1020 described with reference to FIG. 10, UE wireless communication management component 1260 described with reference to FIG. 12, synchronization signal reception management component 835 described with reference to FIG. 8, synchronization signal reception management component 935 described with reference to FIG. 9, or synchronization signal reception management component 1035 described with reference to FIG. 10.

At block 1610, the exemplary method 1600 may include determining a type of the synchronization signal. The operation(s) at block 1610 may be performed using wireless communication management component 820 described with reference to FIG. 8, wireless communication management component 920 described with reference to FIG. 9, wireless communication management component 1020 described with reference to FIG. 10, UE wireless communication management component 1260 described with reference to FIG. 12, synchronization signal type determination component 840 described with reference to FIG. 8, synchronization signal type determination component 940 described with reference to FIG. 9, or synchronization signal type determination component 1040 described with reference to FIG. 10.

At block 1615, the exemplary method 1600 may optionally include determining the type of transmission based at least in part on the type of the synchronization signal. The operation(s) at block 1615 may be performed using wireless communication management component 820 described with reference to FIG. 8, wireless communication management component 920 described with reference to FIG. 9, wireless communication management component 1020 described with reference to FIG. 10, UE wireless communication management component 1260 described with reference to FIG. 12, or transmission type determination component 1060 described with reference to FIG. 10.

At block 1620, the exemplary method 1600 may include determining one or more cell parameters based at least in part on the synchronization signal (e.g., based at least in part on the type of the synchronization signal identified at block 1610 or based at least in part on the type of transmission identified at block 1615). In some examples, the one or more cell parameters may include a timing of an LBT frame boundary, a timing of a radio frame boundary, a timing of a discovery signal transmission boundary, a timing of a CET period boundary, or a measurement of the energy of the synchronization signal. The operation(s) at block 1620 may be performed using wireless communication management component 820 described with reference to FIG. 8, wireless communication management component 920 described with reference to FIG. 9, wireless communication management component 1020 described with reference to FIG. 10, UE wireless communication management component 1260 described with reference to FIG. 12, cell parameter determination component 845 described with reference to FIG. 8, cell parameter determination component 945 described with reference to FIG. 9, or cell parameter determination component 1045 described with reference to FIG. 10.

Thus, the exemplary method 1600 may provide for wireless communication. It should be noted that the exemplary method 1600 is just one implementation and that the operations of the exemplary method 1600 may be rearranged or otherwise modified such that other implementations are possible.

Figure 17:
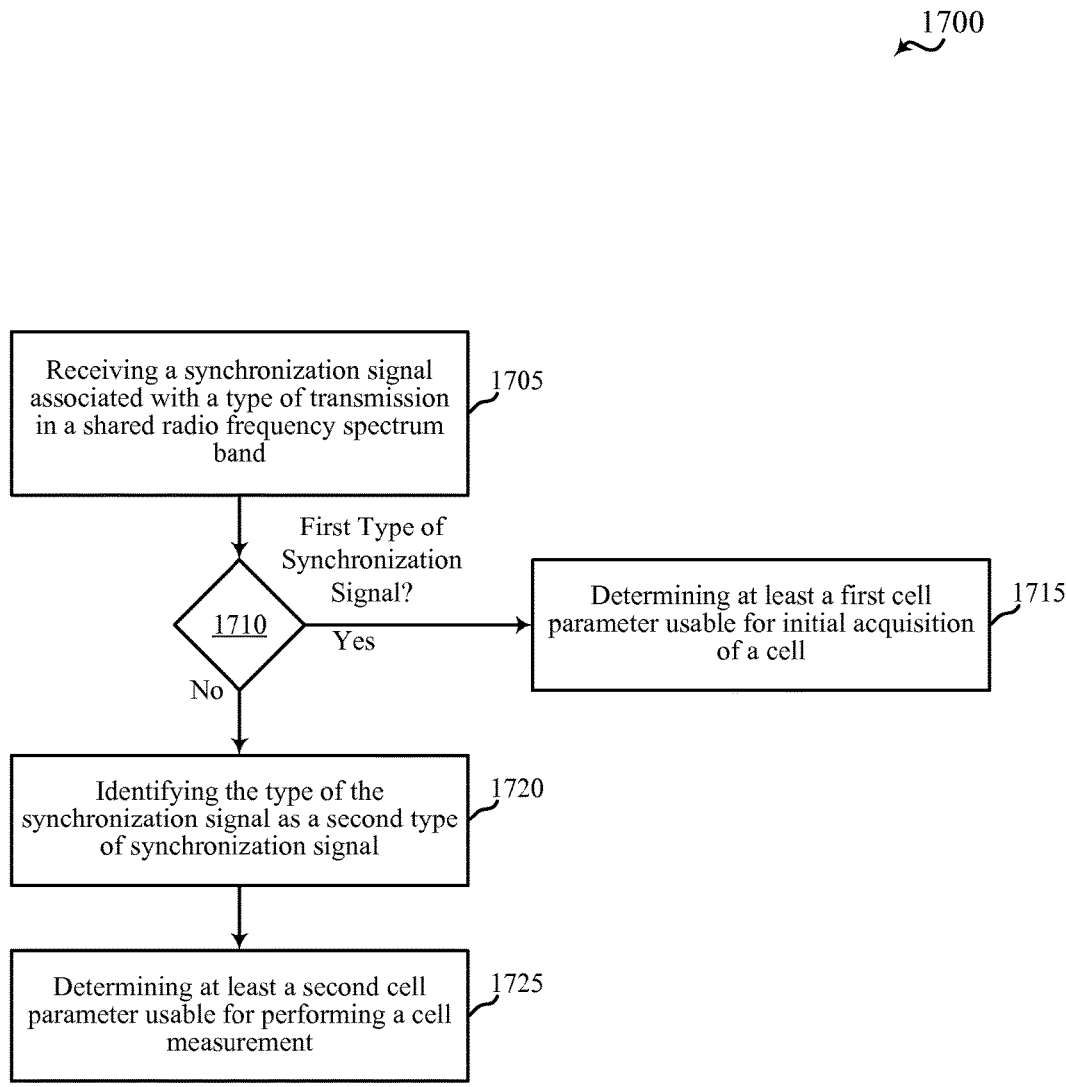
FIG. 17 is a flow chart illustrating an exemplary method for wireless communication, in accordance with aspects of the present disclosure.

FIG. 17 is a flow chart illustrating an exemplary method 1700 for wireless communication, in accordance with aspects of the present disclosure. For clarity, the exemplary method 1700 is described below with reference to aspects of one or more of the UEs 115 described with reference to FIG. 1, first UE 215 second UE 216, third UE 217, or fourth UE 218 described with reference to FIG. 2, UE 1215 described with reference to FIG. 12, apparatus 815 described with reference to FIG. 8, apparatus 915 described with reference to FIG. 9, or apparatus 1015 described with reference to FIG. 10. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1705, the exemplary method 1700 may include receiving a synchronization signal associated with a type of transmission in a shared radio frequency spectrum band. The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by one or more operators in an equally shared or prioritized manner). The operation(s) at block 1705 may be performed using wireless communication management component 820 described with reference to FIG. 8, wireless communication management component 920 described with reference to FIG. 9, wireless communication management component 1020 described with reference to FIG. 10, UE wireless communication management component 1260 described with reference to FIG. 12, synchronization signal reception management component 835 described with reference to FIG. 8, synchronization signal reception management component 935 described with reference to FIG. 9, or synchronization signal reception management component 1035 described with reference to FIG. 10.

At block 1710 or block 1720, the exemplary method 1700 may include determining a type of the synchronization signal. At block 1710, the exemplary method 1700 may include determining whether the synchronization signal is a first type of synchronization signal. Upon identifying the type of the synchronization signal as the first type of synchronization signal, the exemplary method 1700 may continue at block 1715. Upon determining the synchronization signal is not the first type of synchronization signal, the exemplary method 1700 may continue at block 1720, where the exemplary method 1700 may include identifying the synchronization signal as a second type of synchronization signal. The operation(s) at block 1710 or 1720 may be performed using wireless communication management component 820 described with reference to FIG. 8, wireless communication management component 920 described with reference to FIG. 9, wireless communication management component 1020 described with reference to FIG. 10, UE wireless communication management component 1260 described with reference to FIG. 12, synchronization signal type determination component 840 described with reference to FIG. 8, synchronization signal type determination component 940 described with reference to FIG. 9, or synchronization signal type determination component 1040 described with reference to FIG. 10.

At block 1715 or block 1725, the exemplary method 1700 may include determining one or more cell parameters based at least in part on the synchronization signal (e.g., based at least in part on the type of the synchronization signal identified at block 1710 or block 1720). At block 1715, and upon determining the type of the synchronization signal as the first type of synchronization signal, the exemplary method 1700 may include determining at least a first cell parameter usable for initial acquisition of a cell (e.g., a timing of an LBT frame boundary, a timing of a radio frame boundary, a timing of a discovery signal transmission boundary, or a timing of a CET period boundary). At block 1725, and upon determining the type of the synchronization signal as the second type of synchronization signal, the exemplary method 1700 may include determining at least a second cell parameter usable for performing a cell measurement (e.g., a measurement of the energy of the synchronization signal). The operation(s) at block 1715 may be performed using wireless communication management component 820 described with reference to FIG. 8, wireless communication management component 920 described with reference to FIG. 9, wireless communication management component 1020 described with reference to FIG. 10, UE wireless communication management component 1260 described with reference to FIG. 12, the cell parameter determination component 845, 945, or 1045 described with reference to FIG. 8, 9, or 10, or the timing determination component 950 described with reference to FIG. 9. The operation(s) at block 1725 may be performed using wireless communication management component 820 described with reference to FIG. 8, wireless communication management component 920 described with reference to FIG. 9, wireless communication management component 1020 described with reference to FIG. 10, UE wireless communication management component 1260 described with reference to FIG. 12, cell parameter determination component 845 described with reference to FIG. 8, cell parameter determination component 945 described with reference to FIG. 9, cell parameter determination component 1045 described with reference to FIG. 10, or energy measurement component 955 described with reference to FIG. 9.

In some examples, the first type of synchronization signal may include a first type of SSS (e.g., a Type 1 SSS), which first type of SSS may be transmitted in a first half (e.g., a first 5 milliseconds) of a radio frame (e.g., an LTE/LTE-A radio frame) transmitted in a dedicated radio frequency spectrum band. In some examples, the second type of synchronization signal may include a second type of SSS (e.g., a Type 2 LTE/LTE-A SSS), which second type of SSS may be transmitted in a second half (e.g., a second 5 milliseconds) of the radio frame transmitted in the dedicated radio frequency spectrum band. The dedicated radio frequency spectrum band may include a radio frequency spectrum band for which transmitting apparatuses may not be required to contend for access (e.g., a radio frequency spectrum band licensed to one or more users, such as a licensed radio frequency spectrum band usable for LTE/LTE-A communications).

In some examples, the second type of synchronization signal may include the first type of SSS. In at least some of these examples, the first type of synchronization signal may include the second type of SSS.

Thus, the exemplary method 1700 may provide for wireless communication. It should be noted that the exemplary method 1700 is just one implementation and that the operations of the exemplary method 1700 may be rearranged or otherwise modified such that other implementations are possible.

Figure 18:
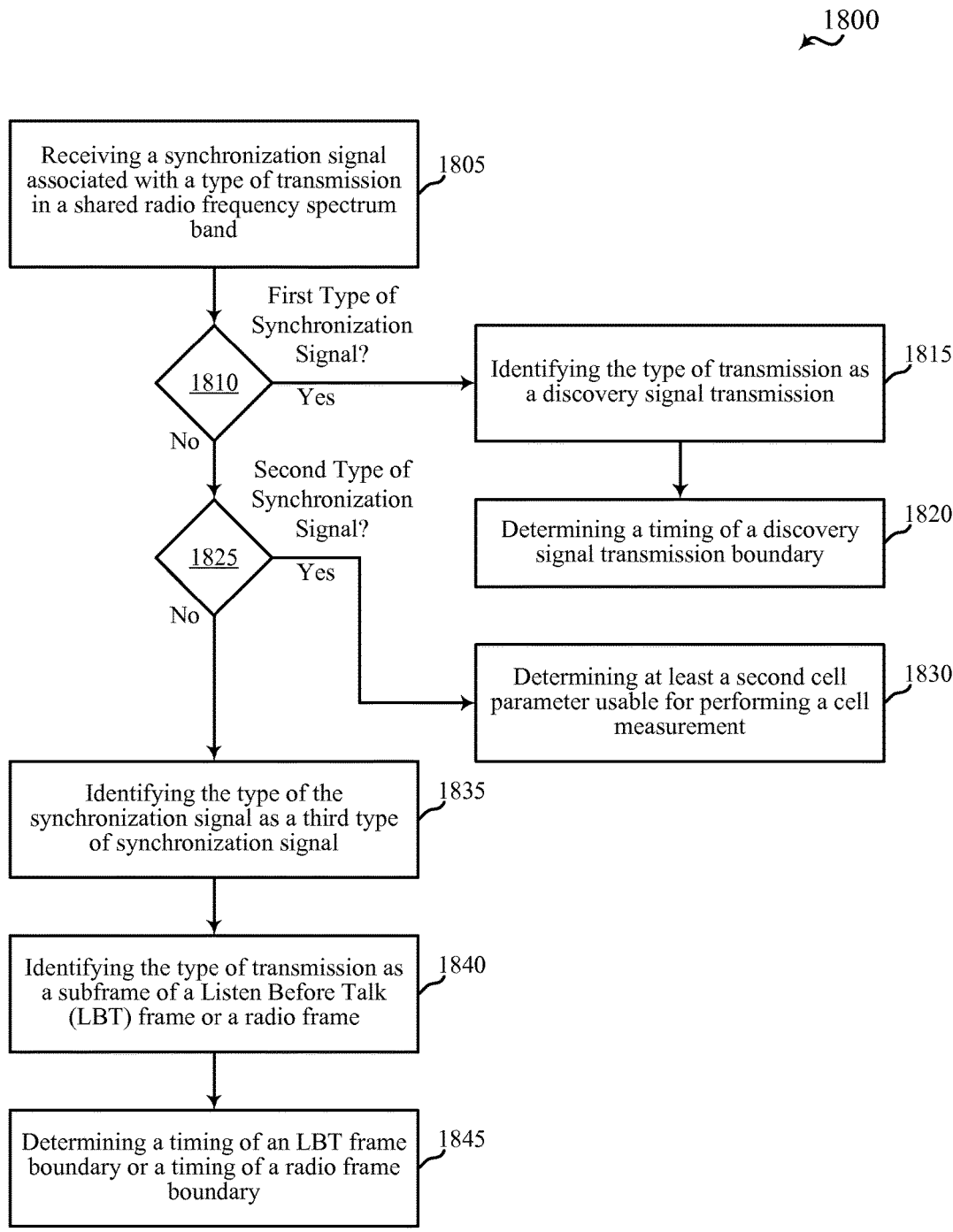
FIG. 18 is a flow chart illustrating an exemplary method for wireless communication, in accordance with aspects of the present disclosure.

FIG. 18 is a flow chart illustrating an exemplary method 1800 for wireless communication, in accordance with aspects of the present disclosure. For clarity, the exemplary method 1800 is described below with reference to aspects of one or more of the UEs 115 described with reference to FIG. 1, first UE 215, second UE 216, third UE 217, or fourth UE 218 described with reference to FIG. 2, UE 1215 described with reference to FIG. 12, apparatus 815 described with reference to FIG. 8, apparatus 915 described with reference to FIG. 9, or 1015 described with reference to FIG. 10. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1805, the exemplary method 1800 may include receiving a synchronization signal associated with a type of transmission in a shared radio frequency spectrum band. The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by one or more operators in an equally shared or prioritized manner). The operation(s) at block 1805 may be performed using wireless communication management component 820 described with reference to FIG. 8, wireless communication management component 920 described with reference to FIG. 9, wireless communication management component 1020 described with reference to FIG. 10, UE wireless communication management component 1260 described with reference to FIG. 12, synchronization signal reception management component 835 described with reference to FIG. 8, synchronization signal reception management component 935 described with reference to FIG. 9, or synchronization signal reception management component 1035 described with reference to FIG. 10.

At block 1810, block 1825, or block 1835, the exemplary method 1800 may include determining a type of the synchronization signal. At block 1810, the exemplary method 1800 may include determining whether the synchronization signal is a first type of synchronization signal. Upon determining the type of the synchronization signal as the first type of synchronization signal, the exemplary method 1800 may continue at block 1815. Upon determining the synchronization signal is not the first type of synchronization signal, the exemplary method 1800 may continue at block 1825. At block 1825, the exemplary method 1800 may include determining whether the synchronization signal is a second type of synchronization signal. Upon identifying the type of the synchronization signal as the second type of synchronization signal, the exemplary method 1800 may continue at block 1830. Upon determining the synchronization signal is not the second type of synchronization signal, the exemplary method 1800 may continue at block 1835, where the exemplary method 1800 may include identifying the synchronization signal as a third type of synchronization signal. The operation(s) at block 1810, 1825, or 1835 may be performed using wireless communication management component 820 described with reference to FIG. 8, wireless communication management component 920 described with reference to FIG. 9, wireless communication management component 1020 described with reference to FIG. 10, UE wireless communication management component 1260 described with reference to FIG. 12, synchronization signal type determination component 840 described with reference to FIG. 8, synchronization signal type determination component 940 described with reference to FIG. 9, or synchronization signal type determination component 1040 described with reference to FIG. 10.

At block 1815 or block 1840, the exemplary method 1800 may include determining the type of transmission based at least in part on the type of the synchronization signal. At block 1815, and upon identifying the type of the synchronization signal as the first type of synchronization signal, the exemplary method 1800 may include identifying the type of transmission as a discovery signal transmission, which in some examples may be a CET. At block 1840, and upon identifying the type of the synchronization signal as the third type of synchronization signal, the exemplary method 1800 may include identifying the type of transmission as a subframe of an LBT frame or a radio frame, which in some examples may be a beginning subframe of an LBT frame or a radio frame. The operation(s) at block 1815 or 1840 may be performed using wireless communication management component 820 described with reference to FIG. 8, wireless communication management component 920 described with reference to FIG. 9, wireless communication management component 1020 described with reference to FIG. 10, UE wireless communication management component 1260 described with reference to FIG. 12, or transmission type determination component 1060 described with reference to FIG. 10.

At block 1820, block 1830, or block 1845, the exemplary method 1800 may include determining one or more cell parameters based at least in part on the synchronization signal (e.g., based at least in part on the type of the synchronization signal identified at block 1810, block 1825, or block 1835, or based at least in part on the type of transmission identified at block 1815 or block 1840). At block 1820, and upon identifying the type of transmission as a CET, the exemplary method 1800 may include determining a timing of a discovery signal transmission boundary, or a CET period boundary. At block 1830, and upon identifying the type of the synchronization signal as the second type of synchronization signal, the exemplary method 1800 may include determining a cell parameter usable for performing a cell measurement (e.g., a measurement of the energy of the synchronization signal). At block 1845, and upon identifying the type of transmission as a beginning subframe of an LBT frame or radio frame, the exemplary method 1800 may include determining a timing of an LBT frame boundary or a timing of a radio frame boundary. The operation(s) at block 1820 may be performed using wireless communication management component 820 described with reference to FIG. 8, wireless communication management component 920 described with reference to FIG. 9, wireless communication management component 1020 described with reference to FIG. 10, UE wireless communication management component 1260 described with reference to FIG. 12, cell parameter determination component 845 described with reference to FIG. 8, cell parameter determination component 945 described with reference to FIG. 9, cell parameter determination component 1045 described with reference to FIG. 10, or discovery signal transmission period boundary determination component 1050 described with reference to FIG. 10. The operation(s) at block 1830 may be performed using wireless communication management component 820 described with reference to FIG. 8, wireless communication management component 920 described with reference to FIG. 9, wireless communication management component 1020 described with reference to FIG. 10, UE wireless communication management component 1260 described with reference to FIG. 12, cell parameter determination component 845 described with reference to FIG. 8, cell parameter determination component 945 described with reference to FIG. 9, or cell parameter determination component 1045 described with reference to FIG. 10. The operation(s) at block 1845 may be performed using wireless communication management component 820 described with reference to FIG. 8, wireless communication management component 920 described with reference to FIG. 9, wireless communication management component 1020 described with reference to FIG. 10, UE wireless communication management component 1260 described with reference to FIG. 12, the cell parameter determination component 845 described with reference to FIG. 8, cell parameter determination component 945 described with reference to FIG. 9, cell parameter determination component 1045 described with reference to FIG. 10, or frame boundary determination component 1055 described with reference to FIG. 10.

In some examples, the first type of synchronization signal may include a first type of SSS (e.g., a Type 1 SSS), which first type of SSS may be transmitted in a first half (e.g., a first 5 milliseconds) of a radio frame (e.g., an LTE/LTE-A radio frame) transmitted in a dedicated radio frequency spectrum band. In some examples, the second type of synchronization signal may include a second type of SSS (e.g., a Type 2 LTE/LTE-A SSS), which second type of SSS may be transmitted in a second half (e.g., a second 5 milliseconds) of the radio frame transmitted in the dedicated radio frequency spectrum band. The dedicated radio frequency spectrum band may include a radio frequency spectrum band for which transmitting apparatuses may not be required to contend for access (e.g., a radio frequency spectrum band licensed to one or more users, such as a licensed radio frequency spectrum band usable for LTE/LTE-A communications).

In some examples, the second type of synchronization signal may include the first type of SSS. In at least some of these examples, the first type of synchronization signal may include the second type of SSS.

An ability to distinguish a timing of a discovery signal transmission boundary or a CET period boundary from a timing of an LBT frame boundary (or a timing of a radio frame boundary) at an earlier time (e.g., because the timing of the discovery signal transmission or CET period boundary and the timing of the LBT frame boundary (or the timing of the radio frame boundary) are identifiable from different types of synchronization signals or different types of transmissions) may be useful when a UE or apparatus performing the exemplary method 1800 is operating in a stand-alone mode in the shared radio frequency spectrum band.

Thus, the exemplary method 1800 may provide for wireless communication. It should be noted that the exemplary method 1800 is just one implementation and that the operations of the exemplary method 1800 may be rearranged or otherwise modified such that other implementations are possible.

In some examples, aspects of two or more of the exemplary method 1600 described with reference to FIG. 16, the exemplary method 1700 described with reference to FIG. 17, or the exemplary method 1800 described with reference to FIG. 18 may be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Enhanced/Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can include RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   receiving a synchronization signal in a shared radio frequency spectrum band;
   determining a type of the received synchronization signal;
   determining whether the received synchronization signal is an opportunistic transmission in a shared radio frequency spectrum band based at least in part on the determined type of the received synchronization signal; and
   determining one or more cell parameters based at least in part on whether the received synchronization signal is determined to be an opportunistic transmission in the shared radio frequency spectrum band.

2. The method of claim 1, wherein the determined type of the received synchronization signal comprises a first type of synchronization signal, and wherein determining the one or more cell parameters comprises:
   determining at least a first cell parameter usable for initial acquisition of a cell.

3. The method of claim 1, wherein the determined type of the received synchronization signal comprises a second type of synchronization signal, and wherein determining the one or more cell parameters comprises:
   determining at least a second cell parameter usable for performing a cell measurement.

4. The method of claim 1, wherein the determined type of transmission of the received synchronization signal in the shared radio frequency spectrum band comprises a discovery signal transmission, and wherein determining the one or more cell parameters comprises determining a timing of a discovery signal transmission period boundary.

5. The method of claim 1, wherein the determined type of transmission of the received synchronization signal in the shared radio frequency spectrum band comprises the opportunistic transmission, and wherein determining the one or more cell parameters comprises determining a timing of an LBT frame boundary or a timing of a radio frame boundary.

6. The method of claim 1, wherein the receiving the synchronization signal, the determining the type of the received synchronization signal, the determining the type of transmission of the received synchronization signal in the shared radio frequency spectrum band, and the determining the one or more cell parameters are performed by a user equipment (UE).

7. An apparatus for wireless communication, comprising:
   a processor;
   memory in electronic communication with the processor; and
   instructions stored in the memory, the instructions being executable by the processor to:
      receive a synchronization signal in a shared radio frequency spectrum band;
      determine a type of the received synchronization signal;
      whether the received synchronization signal is an opportunistic transmission in the shared radio frequency spectrum band based at least in part on the determined type of the received synchronization signal; and
      determine one or more cell parameters based at least in part on the whether the received synchronization signal is determined to be an opportunistic transmission in the shared radio frequency spectrum band.

8. The apparatus of claim 7, wherein the determined type of the received synchronization signal comprises a first type of synchronization signal, and wherein the instructions executable by the processor to determine the one or more cell parameters comprise instructions executable by the processor to:
   determine at least a first cell parameter usable for initial acquisition of a cell.

9. The apparatus of claim 7, wherein the determined type of the received synchronization signal comprises a second type of synchronization signal, and wherein the instructions executable by the processor to determine the one or more cell parameters comprise instructions executable by the processor to:
   determine at least a second cell parameter usable for performing a cell measurement.

10. The method of claim 1, further comprising:
    communicating via the shared radio frequency spectrum band based at least in part on the one or more cell parameters determined based at least in part on the determined type of the received synchronization signal.

11. The apparatus of claim 7, wherein the determined type of transmission of the received synchronization signal in the shared radio frequency spectrum band comprises a discovery signal transmission, and wherein the instructions executable by the processor to determine the one or more cell parameters comprise instructions executable by the processor to determine a timing of a discovery signal transmission period boundary.

12. The apparatus of claim 7, wherein the determined type of transmission of the received synchronization signal in the shared radio frequency spectrum band comprises the opportunistic transmission, and wherein the instructions executable by the processor to determine the one or more cell parameters comprise instructions executable by the processor to determine a timing of an LBT frame boundary or a timing of a radio frame boundary.

13. The apparatus of claim 7, wherein the instructions are executable by the processor to:
    communicate via the shared radio frequency spectrum band based at least in part on the one or more cell parameters determined based at least in part on the determined type of the received synchronization signal.

* * * * *